(12) United States Patent
Gildert et al.

(10) Patent No.: US 12,409,552 B2
(45) Date of Patent: *Sep. 9, 2025

(54) MULTI-PURPOSE ROBOTS AND COMPUTER PROGRAM PRODUCTS, AND METHODS FOR OPERATING THE SAME

(71) Applicant: Sanctuary Cognitive Systems Corporation, Vancouver (CA)

(72) Inventors: Suzanne Gildert, Vancouver (CA); Olivia Norton, North Vancouver (CA); Geordie Rose, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 238 days.

This patent is subject to a terminal disclaimer.

(21) Appl. No.: 17/883,737

(22) Filed: Aug. 9, 2022

(65) Prior Publication Data
US 2023/0054297 A1 Feb. 23, 2023

Related U.S. Application Data

(60) Provisional application No. 63/332,750, filed on Apr. 20, 2022, provisional application No. 63/232,694, filed on Aug. 13, 2021.

(51) Int. Cl.
*B25J 11/00* (2006.01)
*B25J 9/00* (2006.01)
(Continued)

(52) U.S. Cl.
CPC ........... *B25J 9/1656* (2013.01); *B25J 9/0009* (2013.01); *B25J 9/1661* (2013.01); *B25J 9/1689* (2013.01);
(Continued)

(58) Field of Classification Search
CPC ...... B25J 9/1656; B25J 9/0009; B25J 9/1661; B25J 9/1689; B25J 13/006; B25J 9/1664;
(Continued)

(56) References Cited

U.S. PATENT DOCUMENTS

2015/0338836 A1 11/2015 Law et al.
2017/0348854 A1* 12/2017 Oleynik .................. A47J 47/02
(Continued)

OTHER PUBLICATIONS

International Search Report, International Application No. PCT/CA2022/051212, Nov. 18, 2022.
(Continued)

*Primary Examiner* — Adam R Mott
*Assistant Examiner* — Heather J Keniry
(74) *Attorney, Agent, or Firm* — Thomas Mahon

(57) ABSTRACT

Robots, methods, and computer program products for training and operating (semi-) autonomous robots to complete multiple different work objectives are described. A robot accesses a library of reusable work primitives from a catalog of libraries of reusable work primitives, each reusable work primitive corresponding to a respective basic sub-task or sub-action that the robot is operative to autonomously perform. A work objective is analyzed to determine a sequence (i.e., a combination and/or permutation) of reusable work primitives that, when executed by the robot, will complete the work objective. The robot executes the sequence of reusable work primitives to complete the work objective. A robot can be deployed with an appropriate stored library (or access to an appropriate library) of reusable work primitives, based on what the robot is expected to do, or what service category or role the robot will operate in.

16 Claims, 3 Drawing Sheets

(51) Int. Cl.
  *B25J 9/16* (2006.01)
  *B25J 13/00* (2006.01)
  *G05B 19/4155* (2006.01)

(52) U.S. Cl.
  CPC ........ *B25J 13/006* (2013.01); *G05B 19/4155* (2013.01); *G05B 2219/50391* (2013.01)

(58) Field of Classification Search
  CPC .............. B25J 11/008; G05B 19/4155; G05B 2219/50391; G05B 2219/40264; G05B 2219/40395
  See application file for complete search history.

(56) References Cited

U.S. PATENT DOCUMENTS

2021/0229281 A1     7/2021   Natarajan et al.
2021/0387350 A1*   12/2021   Oleynik .................. A47J 44/00

OTHER PUBLICATIONS

Written Opinion of the International Searching Authority, International Application No. PCT/CA2022/051212, Nov. 18, 2022.
Roomba robot vacuum cleaner website—iRobot, tinyurl.com/y6eejeh9.
Boston Dynamics "Stretch," logistics robot, tinyurl.com/yc7ph987.
Search Report in Application No. GB2418990.4, Intellectual Property Office, Jan. 27, 2025.
Combined Search and Examination Report under Sections 17 & 18(3) in Application No. GB2418990.4, Intellectual Property Office, Jan. 28, 2025.

* cited by examiner

MULTI-PURPOSE ROBOTS AND COMPUTER PROGRAM PRODUCTS, AND METHODS FOR OPERATING THE SAME

TECHNICAL FIELD

The present robots, computer program products, and methods generally relate to controlling operation of said robots and computer program products, and particularly relate to multi-purpose robots that are capable of at least semi-autonomously completing multiple different work objectives.

DESCRIPTION OF THE RELATED ART

Robots are machines that may be deployed to perform work. Robots may come in a variety of different form factors, including humanoid form factors. Humanoid robots may be operated by tele-operation systems through which the robot is caused to emulate the physical actions of a human operator or pilot; however, such tele-operation systems typically require very elaborate and complicated interfaces comprising sophisticated sensors and equipment worn by or otherwise directed towards the pilot, thus requiring that the pilot devote their full attention to the tele-operation of the robot and limiting the overall accessibility of the technology.

Robots may be trained or otherwise programmed to operate semi-autonomously or fully autonomously. Training a robot typically involves causing the robot to repeatedly perform a physical task in the real world, which can cause significant wear and tear on the components of the robot before the robot can even be deployed to perform useful work in the field.

BRIEF SUMMARY

According to a broad aspect, the present disclosure describes a method of operation of a robot, the robot comprising a robot body, at least one processor carried by the robot body, and at least one non-transitory processor-readable storage medium carried by the robot body and communicatively coupled to the at least one processor, the method comprising: identifying a first work objective; accessing a first library of reusable work primitives from a catalog of libraries of reusable work primitives, the first library of reusable work primitives including fewer reusable work primitives than the catalog of libraries of reusable work primitives; identifying a first workflow to complete the first work objective, the first workflow comprising a first set of reusable work primitives available in the first library of reusable work primitives of the catalog of libraries of reusable work primitives; and executing the first workflow by executing the first set of reusable work primitives in the first library of reusable work primitives.

The method may further comprise: identifying a second work objective different from the first work objective; accessing a second library of reusable work primitives from the catalog of libraries of reusable work primitives, the second library of reusable work primitives including fewer reusable work primitives than the catalog of libraries of reusable work primitives; identifying a second workflow to complete the second work objective, the second workflow comprising a second set of reusable work primitives available in the second library of reusable work primitives of the catalog of libraries of reusable work primitives, the second set of reusable work primitives being at least partially different from the first set of reusable work primitives; and executing the second workflow by executing the second set of reusable work primitives in the second library of reusable work primitives. The method may further comprise: identifying at least one additional work objective different from the first work objective and the second work objective; accessing at least one additional library of reusable work primitives from the catalog of libraries of reusable work primitives, each additional library of reusable work primitives including fewer reusable work primitives than the catalog of libraries of reusable work primitives; identifying at least one additional workflow to complete the at least one additional work objective, the at least one additional workflow comprising at least one additional set of reusable work primitives available in the at least one additional library of reusable work primitives, the at least one additional set of reusable work primitives being at least partially different from the first set of reusable work primitives and the second set of reusable work primitives; and executing the at least one additional workflow by executing the at least one additional set of reusable work primitives in the at least one additional library of reusable work primitives.

The method may further comprise: identifying a second work objective different from the first work objective; identifying a second workflow to complete the second work objective, the second workflow comprising a second set of reusable work primitives available in the first library of reusable work primitives of the catalog of libraries of reusable work primitives, the second set of reusable work primitives being at least partially different from the first set of reusable work primitives; and executing the second workflow by executing the second set of reusable work primitives in the first library of reusable work primitives. The method may further comprise: identifying at least one additional work objective different from the first work objective and the second work objective; identifying at least one additional workflow to complete the at least one additional work objective, the at least one additional workflow comprising at least one additional set of reusable work primitives available in the first library of reusable work primitives, the at least one additional set of reusable work primitives being at least partially different from the first set of reusable work primitives and the second set of reusable work primitives; and executing the at least one additional workflow by executing the at least one additional set of reusable work primitives in the first library of reusable work primitives.

The robot may include a communication interface communicatively coupled to the at least one processor, and identifying the first work objective may include identifying the first work objective based on instructions related to the first work objective received via the communication interface.

Identifying the first work objective may comprise autonomously identifying, by the at least one processor of the robot, the first work objective.

The robot may include at least one sensor; the method may further comprise capturing, by the at least one sensor, sensor data representing an environment of the robot; and identifying the first work objective may comprise identifying, by the at least one processor of the robot, the first work objective based on at least the sensor data.

The robot may include a communication interface communicatively coupled to the at least one processor, and identifying the first work objective may comprise identifying, by the at least one processor of the robot, the first work objective based on context data received by the communication interface from a device remote from the robot body.

The robot may include a communication interface communicatively coupled to the at least one processor, and identifying the first workflow may include identifying the first workflow based on an indication related to the first workflow received via the communication interface.

Identifying the first workflow may comprise autonomously identifying, by the at least one processor of the robot, the first set of reusable work primitives.

The robot may include at least a first physically actuatable component communicatively coupled to the at least one processor and the catalog of libraries of reusable work primitives may include reusable work primitives performable by the first physically actuatable component; identifying the first workflow may include identifying the first set of reusable work primitives to include at least one reusable work primitive performable by the first physically actuatable component; and executing the first workflow may include executing, by the first physically actuatable component, the at least one reusable work primitive performable by the first physically actuatable component.

Identifying the first workflow to complete the first work objective may include identifying a first permutation of a first combination of reusable work primitives from the catalog of libraries of reusable work primitives.

Executing the first set of reusable work primitives may include executing, by the at least one processor, processor-executable instructions stored in the non-transitory processor-readable storage medium to cause the robot to autonomously perform the first set of reusable work primitives.

The method may further comprise selecting the first library of reusable work primitives from the catalog of libraries of reusable work primitives based on the first work objective.

The method may further comprise selecting the first library of reusable work primitives from the catalog of libraries of reusable work primitives based on the first workflow.

Identifying the first work objective may include identifying the first work objective based on the first library of reusable work primitives.

Identifying the first workflow may include identifying the first workflow based on the first library of reusable work primitives.

Identifying the first work objective may include identifying the first work objective based at least in part on a service category.

The method may further comprise selecting the first library of reusable work primitives from the catalog of libraries of reusable work primitives based on a service category. The robot may include a communication interface communicatively coupled to the at least one processor; and the method may further comprise identifying, by the at least one processor, the service category based on an indication of the service category received via the communication interface. The method may further comprise identifying, by the at least one processor, the service category based on an indication of the service category stored on the at least one non-transitory processor-readable storage medium of the robot.

The catalog of libraries of reusable work primitives may include a plurality of libraries of reusable work primitives directed to respective service categories. Each library in the plurality of libraries may be directed to a respective service category selected from a group of service categories consisting of: medical service; cleaning service; housekeeping service; warehouse service; fetch service; delivery service; repair service; painting service; and retail service.

The first library of reusable work primitives may be selected from a plurality of libraries of reusable work primitives, each library of reusable work primitives including a plurality of work primitives which is at least partially different from respective pluralities of reusable work primitives included in other libraries of reusable work primitives. Each library of reusable work primitives may be defined according to a set of work objectives performable by reusable work primitives included in the respective library of reusable work primitives. Each library of reusable work primitives may be defined according to a place of use for the respective library of reusable work primitives.

The robot may include a communication interface communicatively coupled to the at least one processor; and accessing the first library of reusable work primitives from the catalog of libraries of reusable work primitives may comprise: accessing, via the communication interface, the first library of reusable work primitives stored on at least one remote non-transitory processor-readable storage medium of a device remote from the robot. Accessing, via the communication interface, the first library of reusable work primitives stored on at least one remote non-transitory processor-readable storage medium of a device remote from the robot may comprise: transferring, via the communication interface, the first library of reusable work primitives to the at least one non-transitory processor-readable storage medium of the robot.

Accessing the first library of reusable work primitives from the catalog of libraries of reusable work primitives may comprise: accessing the first library of reusable work primitives stored on the at least one non-transitory processor-readable storage medium of the robot.

According to another broad aspect, the present disclosure describes a robot comprising: a robot body; at least one processor carried by the robot body; and at least one non-transitory processor-readable storage medium carried by the robot body and communicatively coupled to the at least one processor, the at least one non-transitory processor-readable storage medium storing processor-executable instructions which, when executed by the at least one processor, cause the robot to: identify a first work objective; access a first library of reusable work primitives from a catalog of libraries of reusable work primitives, the first library of reusable work primitives including fewer reusable work primitives than the catalog of libraries of reusable work primitives; identify a first workflow to complete the first work objective, the first workflow comprising a first set of reusable work primitives available in the first library of reusable work primitives of the catalog of libraries of reusable work primitives; and execute the first workflow by executing the first set of reusable work primitives in the first library of reusable work primitives.

The processor-executable instructions may further cause the robot to: identify a second work objective different from the first work objective; access a second library of reusable work primitives from the catalog of libraries of reusable work primitives, the second library of reusable work primitives including fewer reusable work primitives than the catalog of libraries of reusable work primitives; identify a second workflow to complete the second work objective, the second workflow comprising a second set of reusable work primitives available in the second library of reusable work primitives of the catalog of libraries of reusable work primitives, the second set of reusable work primitives being at least partially different from the first set of reusable work primitives; and execute the second workflow by executing the second set of reusable work primitives in the second library of reusable work primitives. The processor-executable instructions may further cause the robot to: identify at least one additional work objective different from the first work objective and the second work objective; access at least one additional library of reusable work primitives from the catalog of libraries of reusable work primitives, each additional library of reusable work primitives including fewer reusable work primitives than the catalog of libraries of reusable work primitives; identify at least one additional workflow to complete the at least one additional work objective, the at least one additional workflow comprising at least one additional set of reusable work primitives available in the at least one additional library of reusable work primitives, the at least one additional set of reusable work primitives being at least partially different from the first set of reusable work primitives and the second set of reusable work primitives; and execute the at least one additional workflow by executing the at least one additional set of reusable work primitives in the at least one additional library of reusable work primitives.

The processor-executable instructions may further cause the robot to: identify a second work objective different from the first work objective; identify a second workflow to complete the second work objective, the second workflow comprising a second set of reusable work primitives available in the first library of reusable work primitives of the catalog of libraries of reusable work primitives, the second set of reusable work primitives being at least partially different from the first set of reusable work primitives; and execute the second workflow by executing the second set of reusable work primitives in the first library of reusable work primitives. The processor-executable instructions may further cause the robot to: identify at least one additional work objective different from the first work objective and the second work objective; identify at least one additional workflow to complete the at least one additional work objective, the at least one additional workflow comprising at least one additional set of reusable work primitives available in the first library of reusable work primitives, the at least one additional set of reusable work primitives being at least partially different from the first set of reusable work primitives and the second set of reusable work primitives; and execute the at least one additional workflow by executing the at least one additional set of reusable work primitives in the first library of reusable work primitives.

The robot may further comprise a communication interface communicatively coupled to the at least one processor, and the processor-executable instructions which cause the robot to identify the first work objective may cause the robot to: identify the first work objective based on instructions related to the first work objective received via the communication interface.

The processor-executable instructions which cause the robot to identify the first work objective may cause the robot to: autonomously identify, by the at least one processor of the robot, the first work objective.

The robot may further comprise at least one sensor; the processor-executable instructions may further cause the robot to capture, by the at least one sensor, sensor data representing an environment of the robot; and the processor-executable instructions which cause the robot to identify the first work objective may cause the robot to: identify, by the at least one processor of the robot, the first work objective based on at least the sensor data.

The robot may further comprise a communication interface communicatively coupled to the at least one processor; and the processor-executable instructions which cause the robot to identify the first work objective may cause the robot to: identify, by the at least one processor of the robot, the first work objective based on context data received by the communication interface from a device remote from the robot body.

The robot may further comprise a communication interface communicatively coupled to the at least one processor and the processor-executable instructions which cause the robot to identify the first workflow may cause the robot to: identify the first workflow based on an indication related to the first workflow received via the communication interface.

The processor-executable instructions which cause the robot to identify the first workflow may cause the robot to: autonomously identify, by the at least one processor of the robot, the first set of reusable work primitives.

The robot may further comprise at least a first physically actuatable component communicatively coupled to the at least one processor; the catalog of libraries of reusable work primitives may include reusable work primitives performable by the first physically actuatable component; the processor-executable instructions which cause the robot to identify the first workflow may cause the robot to: identify the first set of reusable work primitives to include at least one reusable work primitive performable by the first physically actuatable component; and the processor-executable instructions which cause the robot to execute the first workflow may cause the robot to: execute, by the first physically actuatable component, the at least one reusable work primitive performable by the first physically actuatable component.

The processor-executable instructions which cause the robot to identify the first workflow to complete the first work objective may cause the robot to: identify a first permutation of a first combination of reusable work primitives from the catalog of libraries of reusable work primitives.

The processor-executable instructions may further cause the robot to select the first library of reusable work primitives from the catalog of libraries of reusable work primitives based on the first work objective. The processor-executable instructions may further cause the robot to select the first library of reusable work primitives from the catalog of libraries of reusable work primitives based on the first workflow.

The processor-executable instructions which cause the robot to identify the first work objective may cause the robot to: identify the first work objective based on the first library of reusable work primitives.

The processor-executable instructions which cause the robot to identify the first workflow may cause the robot to: identify the first workflow based on the first library of reusable work primitives.

The processor-executable instructions which cause the robot to identify the first work objective may cause the robot to: identify the first work objective based at least in part on a service category.

The processor-executable instructions may further cause the robot to select the first library of reusable work primitives from the catalog of libraries of reusable work primitives based on a service category. The robot may further comprise a communication interface communicatively coupled to the at least one processor, and the processor-executable instructions may further cause the robot to identify, by the at least one processor, the service category based on an indication of the service category received via the communication interface. The processor-executable instructions may further cause the robot to identify, by the at least one processor, the service category based on an indication of the service category stored on the at least one non-transitory processor-readable storage medium of the robot.

The catalog of libraries of reusable work primitives may include a plurality of libraries of reusable work primitives directed to respective service categories. Each library in the plurality of libraries may be directed to a respective service category selected from a group of service categories consisting of: medical service; cleaning service; housekeeping service; warehouse service; fetch service; delivery service; repair service; painting service; and retail service.

The first library of reusable work primitives may be selected from a plurality of libraries of reusable work primitives, each library of reusable work primitives including a plurality of work primitives which is at least partially different from respective pluralities of reusable work primitives included in other libraries of reusable work primitives. Each library of reusable work primitives may be defined according to a set of work objectives performable by reusable work primitives included in the respective library of reusable work primitives. Each library of reusable work primitives may be defined according to a place of use for the respective library of reusable work primitives.

The robot may further comprise a communication interface communicatively coupled to the at least one processor, and the processor-executable instructions which cause the robot to access the first library of reusable work primitives from the catalog of libraries of reusable work primitives may cause the robot to: access, via the communication interface, the first library of reusable work primitives stored on at least one remote non-transitory processor-readable storage medium of a device remote from the robot. The processor-executable instructions which cause the robot to access, via the communication interface, the first library of reusable work primitives stored on at least one remote non-transitory processor-readable storage medium of a device remote from the robot may cause the robot to: transfer, via the communication interface, the first library of reusable work primitives to the at least one non-transitory processor-readable storage medium of the robot.

The processor-executable instructions which cause the robot to access the first library of reusable work primitives from the catalog of libraries of reusable work primitives may cause the robot to: access the first library of reusable work primitives stored on the at least one non-transitory processor-readable storage medium of the robot.

According to yet another broad aspect, the present disclosure describes a computer program product comprising processor-executable instructions or data that, when the computer program product is stored in a non-transitory processor-readable storage medium of a robot, and the computer program product is executed by at least one processor of the robot, the at least one processor communicatively coupled to the non-transitory processor-readable storage medium, causes the robot to: identify a first work objective; access a first library of reusable work primitives from a catalog of libraries of reusable work primitives, the first library of reusable work primitives including fewer reusable work primitives than the catalog of libraries of reusable work primitives; identify a first workflow to complete the first work objective, the first workflow comprising a first set of reusable work primitives available in the first library of reusable work primitives of the catalog of libraries of reusable work primitives; and execute the first workflow by executing the first set of reusable work primitives in the first library of reusable work primitives.

The processor-executable instructions or data of the computer program product may further cause the robot to: identify a second work objective different from the first work objective; access a second library of reusable work primitives from the catalog of libraries of reusable work primitives, the second library of reusable work primitives including fewer reusable work primitives than the catalog of libraries of reusable work primitives; identify a second workflow to complete the second work objective, the second workflow comprising a second set of reusable work primitives available in the second library of reusable work primitives of the catalog of libraries of reusable work primitives, the second set of reusable work primitives being at least partially different from the first set of reusable work primitives; and execute the second workflow by executing the second set of reusable work primitives in the second library of reusable work primitives. The processor-executable instructions or data of the computer program product may further cause the robot to: identify at least one additional work objective different from the first work objective and the second work objective; access at least one additional library of reusable work primitives from the catalog of libraries of reusable work primitives, each additional library of reusable work primitives including fewer reusable work primitives than the catalog of libraries of reusable work primitives; identify at least one additional workflow to complete the at least one additional work objective, the at least one additional workflow comprising at least one additional set of reusable work primitives available in the at least one additional library of reusable work primitives, the at least one additional set of reusable work primitives being at least partially different from the first set of reusable work primitives and the second set of reusable work primitives; and execute the at least one additional workflow by executing the at least one additional set of reusable work primitives in the at least one additional library of reusable work primitives.

The processor-executable instructions or data of the computer program product may further cause the robot to: identify a second work objective different from the first work objective; identify a second workflow to complete the second work objective, the second workflow comprising a second set of reusable work primitives available in the first library of reusable work primitives of the catalog of libraries of reusable work primitives, the second set of reusable work primitives being at least partially different from the first set of reusable work primitives; and execute the second workflow by executing the second set of reusable work primitives in the first library of reusable work primitives. The processor-executable instructions or data of the computer program product may further cause the robot to: identify at least one additional work objective different from the first work objective and the second work objective; identify at least one additional workflow to complete the at least one additional work objective, the at least one additional workflow comprising at least one additional set of reusable work primitives available in the first library of reusable work primitives, the at least one additional set of reusable work primitives being at least partially different from the first set of reusable work primitives and the second set of reusable work primitives; and execute the at least one additional workflow by executing the at least one additional set of reusable work primitives in the first library of reusable work primitives.

The robot may further include a communication interface communicatively coupled to the at least one processor, and the processor-executable instructions or data of the computer program product which cause the robot to identify the first work objective may cause the robot to: identify the first work objective based on instructions related to the first work objective received via the communication interface.

The processor-executable instructions or data of the computer program product which cause the robot to identify the first work objective may cause the robot to: autonomously identify, by the at least one processor of the robot, the first work objective.

The robot may include at least one sensor; the processor-executable instructions or data of the computer program product may further cause the robot to capture, by the at least one sensor, sensor data representing an environment of the robot; and the processor-executable instructions or data of the computer program product which cause the robot to identify the first work objective may cause the robot to: identify, by the at least one processor of the robot, the first work objective based on at least the sensor data.

The robot may include a communication interface communicatively coupled to the at least one processor, and the processor-executable instructions or data of the computer program product which cause the robot to identify the first work objective may cause the robot to: identify, by the at least one processor of the robot, the first work objective based on context data received by the communication interface from a device remote from the robot body.

The robot may include a communication interface communicatively coupled to the at least one processor, and the processor-executable instructions or data of the computer program product which cause the robot to identify the first workflow may cause the robot to: identify the first workflow based on an indication related to the first workflow received via the communication interface.

The processor-executable instructions or data of the computer program product which cause the robot to identify the first workflow may cause the robot to: autonomously identify, by the at least one processor of the robot, the first set of reusable work primitives.

The robot may further include at least a first physically actuatable component communicatively coupled to the at least one processor, the catalog of libraries of reusable work primitives may include reusable work primitives performable by the first physically actuatable component; the processor-executable instructions or data of the computer program product which cause the robot to identify the first workflow may cause the robot to: identify the first set of reusable work primitives to include at least one reusable work primitive performable by the first physically actuatable component; and the processor-executable instructions or data of the computer program product which cause the robot to execute the first workflow may cause the robot to: execute, by the first physically actuatable component, the at least one reusable work primitive performable by the first physically actuatable component.

The processor-executable instructions or data of the computer program product which cause the robot to identify the first workflow to complete the first work objective may cause the robot to: identify a first permutation of a first combination of reusable work primitives from the catalog of libraries of reusable work primitives.

The processor-executable instructions or data of the computer program product may further cause the robot to select the first library of reusable work primitives from the catalog of libraries of reusable work primitives based on the first work objective.

The processor-executable instructions or data of the computer program product may further cause the robot to select the first library of reusable work primitives from the catalog of libraries of reusable work primitives based on the first workflow.

The processor-executable instructions or data of the computer program product which cause the robot to identify the first work objective may cause the robot to: identify the first work objective based on the first library of reusable work primitives.

The processor-executable instructions or data of the computer program product which cause the robot to identify the first workflow may cause the robot to: identify the first workflow based on the first library of reusable work primitives.

The processor-executable instructions or data of the computer program product which cause the robot to identify the first work objective may cause the robot to: identify the first work objective based at least in part on a service category.

The processor-executable instructions or data of the computer program product may further cause the robot to select the first library of reusable work primitives from the catalog of libraries of reusable work primitives based on a service category. The robot may further include a communication interface communicatively coupled to the at least one processor, and the processor-executable instructions or data of the computer program product may further cause the robot to identify, by the at least one processor, the service category based on an indication of the service category received via the communication interface. The processor-executable instructions or data of the computer program product may further cause the robot to identify, by the at least one processor, the service category based on an indication of the service category stored on the at least one non-transitory processor-readable storage medium of the robot.

The catalog of libraries of reusable work primitives may include a plurality of libraries of reusable work primitives directed to respective service categories. Each library in the plurality of libraries may be directed to a respective service category selected from a group of service categories consisting of: medical service; cleaning service; housekeeping service; warehouse service; fetch service; delivery service; repair service; painting service; and retail service.

The first library of reusable work primitives may be selected from a plurality of libraries of reusable work primitives, each library of reusable work primitives including a plurality of work primitives which is at least partially different from respective pluralities of reusable work primitives included in other libraries of reusable work primitives. Each library of reusable work primitives may be defined according to a set of work objectives performable by reusable work primitives included in the respective library of reusable work primitives. Each library of reusable work primitives may be defined according to a place of use for the respective library of reusable work primitives.

The robot may further include a communication interface communicatively coupled to the at least one processor, and the processor-executable instructions or data of the computer program product which cause the robot to access the first library of reusable work primitives from the catalog of libraries of reusable work primitives may cause the robot to: access, via the communication interface, the first library of reusable work primitives stored on at least one remote non-transitory processor-readable storage medium of a device remote from the robot. The processor-executable instructions or data of the computer program product which cause the robot to access, via the communication interface, the first library of reusable work primitives stored on at least one remote non-transitory processor-readable storage medium of a device remote from the robot may cause the robot to: transfer, via the communication interface, the first library of reusable work primitives to the at least one non-transitory processor-readable storage medium of the robot.

The processor-executable instructions or data of the computer program product which cause the robot to access the first library of reusable work primitives from the catalog of libraries of reusable work primitives may cause the robot to: access the first library of reusable work primitives stored on the at least one non-transitory processor-readable storage medium of the robot.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
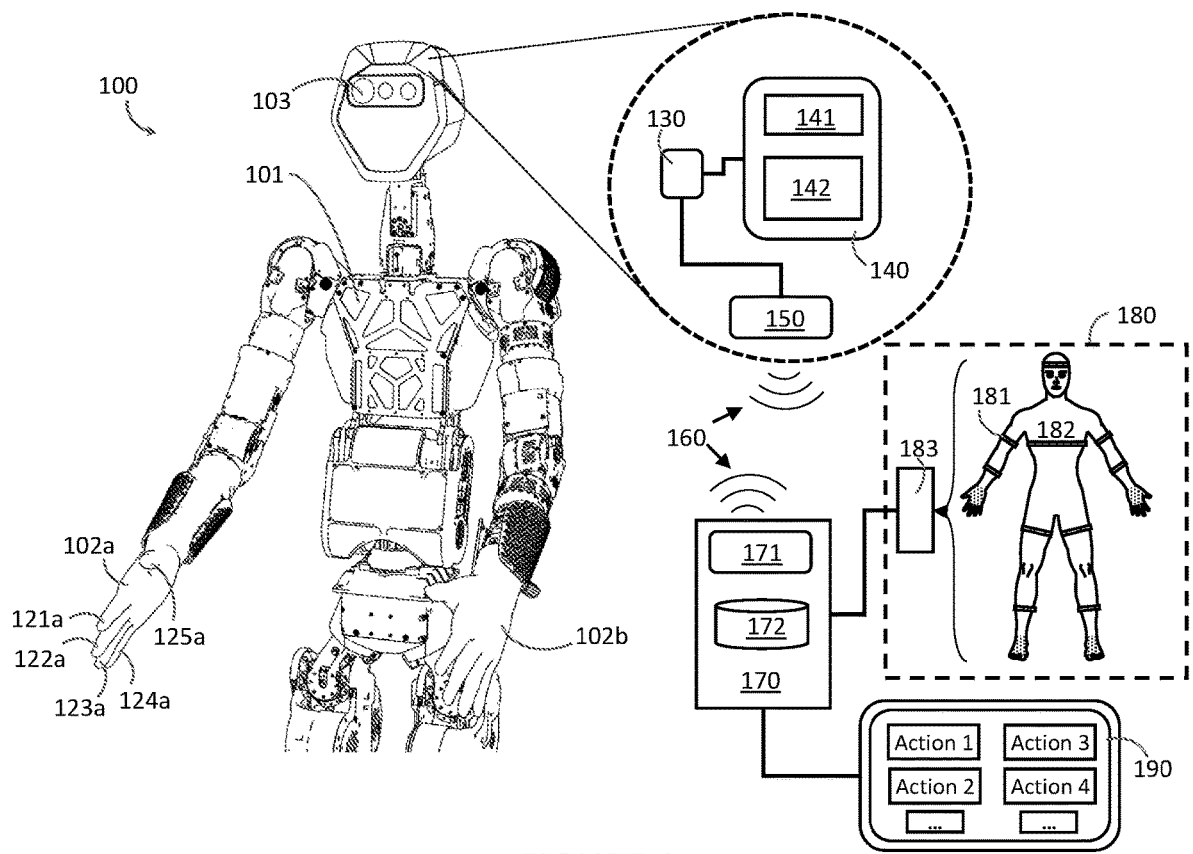
FIG. 1 is an illustrative diagram of an exemplary robot system comprising various features and components described throughout the present robots, methods, and computer program products.

The following description sets forth specific details in order to illustrate and provide an understanding of the various implementations and embodiments of the present robots, computer program products, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present robots, computer program products, and methods.

A general-purpose robot is able to complete multiple different work objectives. As used throughout this specification and the appended claims, the term "work objective" refers to a particular task, job, assignment, or application that has a specified goal and a determinable outcome, often (though not necessarily) in the furtherance of some economically valuable work. Work objectives exist in many aspects of business, research and development, commercial endeavors, and personal activities. Exemplary work objectives include, without limitation: cleaning a location (e.g., a bathroom) or an object (e.g., a bathroom mirror), preparing a meal, loading/unloading a storage container (e.g., a truck), taking inventory, collecting one or more sample(s), making one or more measurement(s), building or assembling an object, destroying or disassembling an object, delivering an item, harvesting objects and/or data, and so on. The various implementations described herein provide robots, computer program products, and methods for initializing, configuring, training, operating, and/or deploying a robot to at least semi-autonomously complete multiple different work objectives.

In accordance with the present robots, computer program products, and methods, a work objective is deconstructed or broken down into a "workflow" comprising a set of "work primitives", where successful completion of the work objective involves performing each work primitive in the workflow. Depending on the specific implementation, completion of a work objective may be achieved by (i.e., a workflow may comprise): i) performing a corresponding set of work primitives sequentially or in series; ii) performing a corresponding set of work primitives in parallel; or iii) performing a corresponding set of work primitives in any combination of in series and in parallel (e.g., sequentially with overlap) as suits the work objective and/or the robot performing the work objective. Thus, in some implementations work primitives may be construed as lower-level activities, steps, or sub-tasks that are performed or executed as a workflow in order to complete a higher-level work objective.

Advantageously, and in accordance with the present robots, computer program products, and methods, a catalog of "reusable" work primitives may be defined. A work primitive is reusable if it may be generically invoked, performed, employed, or applied in the completion of multiple different work objectives. For example, a reusable work primitive is one that is common to the respective workflows of multiple different work objectives. In some implementations, a reusable work primitive may include at least one variable that is defined upon or prior to invocation of the work primitive. For example, "pick up *object*" may be a reusable work primitive where the process of "picking up" may be generically performed at least semi-autonomously in furtherance of multiple different work objectives and the

*object* to be picked up may be defined based on the specific work objective being pursued.

As stated previously, the various implementations described herein provide robots, computer program products, and methods where a robot is enabled to at least semi-autonomously complete multiple different work objectives. Unless the specific context requires otherwise, the term "autonomously" is used throughout this specification and the appended claims to mean "without control by another party" and the term "semi-autonomously" is used to mean "at least partially autonomously." In other words, throughout this specification and the appended claims, the term "semi-autonomously" means "with limited control by another party" unless the specific context requires otherwise. An example of a semi-autonomous robot is one that can independently and/or automatically execute and control some of its own low-level functions, such as its mobility and gripping functions, but relies on some external control for high-level instructions such as what to do and/or how to do it.

In accordance with the present robots, computer program products, and methods, a catalog of reusable work primitives may be defined, identified, developed, or constructed such that any given work objective across multiple different work objectives may be completed by executing a corresponding workflow comprising a particular combination and/or permutation of reusable work primitives selected from the catalog of reusable work primitives. Once such a catalog of reusable work primitives has been established, one or more robot(s) may be trained to autonomously or automatically perform each individual reusable work primitive in the catalog of reusable work primitives without necessarily including the context of: i) a particular workflow of which the particular reusable work primitive being trained is a part, and/or ii) any other reusable work primitive that may, in a particular workflow, precede or succeed the particular reusable work primitive being trained. In this way, a semi-autonomous robot may be operative to autonomously or automatically perform each individual reusable work primitive in a catalog of reusable work primitives and only require instruction, direction, or guidance from another party (e.g., from an operator, user, or pilot) when it comes to deciding which reusable work primitive(s) to perform and/or in what order. In other words, an operator, user, or pilot may provide a workflow consisting of reusable work primitives to a semi-autonomous robot and the semi-autonomous robot may autonomously or automatically execute the reusable work primitives according to the workflow to complete a work objective. For example, a semi-autonomous humanoid robot may be operative to autonomously look left when directed to look left, autonomously open its right end effector when directed to open its right end effector, and so on, without relying upon detailed low-level control of such functions by a third party. Such a semi-autonomous humanoid robot may autonomously complete a work objective once given instructions regarding a workflow detailing which reusable work primitives it must perform, and in what order, in order to complete the work objective. Furthermore, in accordance with the present robots, methods, and computer program products, a robot may operate fully autonomously if it is trained or otherwise configured to analyze a work objective and independently define a corresponding workflow itself by deconstructing the work objective into a set of reusable work primitives from a library of reusable work primitives that the robot is operative to autonomously perform.

Reusable work primitives in the catalog of reusable work primitives can be organized into a plurality of libraries of reusable work primitives. In this sense, the catalog of reusable work primitives can also be referred to as a catalog of libraries of reusable work primitives. Each library of reusable work primitives includes fewer reusable work primitives than the catalog of work primitives; that is, each library represents a subset of reusable work primitives of the catalog of reusable work primitives. For a given deployment, a robot may access (or have locally stored) a limited amount of libraries of reusable work primitives, based on the nature of the deployment. This advantageously saves storage space and/or processing burden at the robot. In particular, for a general-purpose robot, a catalog of work primitives usable by the robot may include an immense quantity of reusable work primitives, but in many cases a given deployment, work objective, or workflow may only require a much smaller number of reusable work primitives. If the entire catalog were stored and accessed at the robot, this could significantly burden the robot. For example, when constructing or executing a workflow, it is computationally intensive for the robot to navigate through, process, or select appropriate reusable work primitives from the entire catalog of work primitives. In particular, a workflow is constructed of a specific combination and/or permutation of discrete reusable work primitives. Each additional reusable work primitive considered (i.e. available for inclusion in a workflow) exponentially increases the total number of possible workflows (because there are exponentially more possible combinations or permutations of reusable work primitives), and thus also exponentially increases processing burden to identify or construct a workflow. By instead accessing one or more limited libraries of reusable work primitives, this computational burden is significantly decreased. This improves responsiveness and efficiency, and/or reduces complexity and cost of hardware of the robot. Further, the entire catalog of reusable work primitives may occupy a significant amount of storage space at the robot; storing one or more limited libraries of reusable work primitives instead of the entire catalog reduces storage burden. Thus, it is preferable to limit reusable work primitives accessible to the robot to those likely to be used for a given deployment or service category in which the robot operates.

Each library of reusable work primitives is at least partially different from other libraries of reusable work primitives. While libraries may overlap and include at least one common reusable work primitive (possibly many more than one), or not, each library includes a plurality of reusable work primitives which is different by at least one reusable work primitive from other libraries. As an example, a first library could include at least one reusable work primitive which is not included in a second library. The second library could likewise include at least one reusable work primitive which is not included in the first library. Alternatively, each reusable work primitive in the second library could be included in the first library, but the first library includes at least one additional reusable work primitive which is not included in the second library (i.e., the first library is a larger set of reusable work primitives which completely overlaps the second library). In such an example, the first and second libraries are still considered "different" from each other. In some implementations, a first library and a second library may be "wholly different" from one another in that they each contain a respective unit set of reusable work primitives with no overlap therebetween.

In the context of a robot, reusable work primitives may correspond to basic low-level functions that the robot is operable to (e.g., autonomously or automatically) perform and that the robot may call upon or execute in order to achieve something. Examples of reusable work primitives for a humanoid robot include, without limitation: look up, look down, look left, look right, move right arm, move left arm, close right end effector, open right end effector, close left end effector, open left end effector, move forward, turn left, turn right, move backwards, and so on; however, a person of skill in the art will appreciate that: i) the foregoing list of exemplary reusable work primitives for a humanoid robot is by no means exhaustive; ii) the present robots, computer program products, and methods are not limited in any way to robots having a humanoid form factor; and iii) the complete composition of any library of reusable work primitives depends on the design and functions of the specific robot for which the library of reusable work primitives is constructed.

A robot may be operative to perform any number of high-level functions based at least in part on its hardware and software configurations. For example, a robot with legs or wheels may be operative to move, a robot with a gripper may be operative to pick things up, and a robot with legs and a gripper may be operative to displace objects. The performance of any such high-level function generally requires the controlled execution of multiple low-level functions. For example, a mobile robot must exercise control of a number of different lower-level functions in order to controllably move, including control of mobility actuators (e.g., driving its legs or wheels) that govern functional parameters like speed, trajectory, balance, and so on. In accordance with the present robots, computer program products, and methods, the high-level functions that a robot is operative to perform are deconstructed or broken down into a set of basic components or constituents, referred to throughout this specification and the appended claims as "work primitives". Unless the specific context requires otherwise, work primitives may be construed as the building blocks of which higher-level robot functions are constructed.

In some implementations training a robot to autonomously perform a reusable work primitive may be completed in a real-world environment or a simulated environment. Once a robot has been trained to autonomously perform a library of reusable work primitives, tele-operation of the robot by a remote pilot may be abstracted to the level of reusable work primitives; i.e., a remote operator or pilot that controls the robot through a tele-operation system may do so by simply instructing the robot which reusable work primitive(s) to perform and, in some implementations, in what order to perform them, and the robot may have sufficient autonomy or automation (resulting from, for example, the training described above) to execute a complete work objective based on such limited control instruction from the pilot.

As described previously, "clean a bathroom mirror" is an illustrative example of a work objective that can be deconstructed into a set of work primitives to achieve a goal and for which the outcome is determinable. The goal in this case is a clean bathroom mirror, and an exemplary set of work primitives (or workflow) that completes the work objective is as follows:

| Work Primitive Index | Work Primitive |
| --- | --- |
| 1 | Locate cleaning solution |
| 2 | Grasp the cleaning solution |
| 3 | Locate mirror |

-continued

| Work Primitive Index | Work Primitive |
| --- | --- |
| 4 | Aim the cleaning solution at the mirror |
| 5 | Dispense the cleaning solution onto the mirror |
| 6 | Locate the cleaning cloth |
| 7 | Grasp the cleaning cloth |
| 8 | Pass the cleaning cloth over the entire surface of the mirror |
| 9 | Return to ready |

A person of skill in the art will appreciate that the exemplary workflow above, comprising nine work primitives, is used as an illustrative example of a workflow that may be deployed to complete the work objective of cleaning a bathroom mirror; however, in accordance with the present robots, computer program products, and methods the precise definition and composition of each work primitive and the specific combination and/or permutation of work primitives selected/executed to complete a work objective (i.e., the specific construction of a workflow) may vary in different implementations. For example, in some implementations work primitives 3, 4, and 5 above (i.e., locate mirror, aim the cleaning solution at the mirror, and dispense the cleaning solution onto the mirror) may all be combined into one higher-level work primitive as "spray cleaning solution on the mirror" whereas in other implementations those same work primitives may be broken down into additional lower-level work primitives as, for example:

Locate the mirror
Identify the boundaries of the mirror
Aim the cleaning solution at a first location within the boundaries of the mirror
Squeeze the cleaning solution
Aim the cleaning solution at a second location within the boundaries of the mirror
Squeeze the cleaning solution
Etc.

Based on the above example and description, a person of skill in the art will appreciate that the granularity of work primitives may vary across different implementations of the present robots, computer program products, and methods. Furthermore, in accordance with the present robots, computer program products, and methods the work primitives are advantageously "reusable" in the sense that each work primitive may be employed, invoked, applied, or "reused" in the performance of more than one overall work objective. For example, while cleaning a bathroom mirror may involve the work primitive "grasp the cleaning solution," other work objectives may also use the "grasp the cleaning solution" work primitive, such as for example "clean the toilet," "clean the window," and/or "clean the floor." In some implementations, work primitives may be abstracted to become more generic. For example, "grasp the cleaning solution" may be abstracted to "grasp the spray bottle" or "grasp the *object1*" where the *object1* variable is defined as "*object1*=spray bottle", and "locate the mirror" may be abstracted to "locate the object that needs to be sprayed" or simply "locate *object2*" where "*object2*=mirror". In such cases, the "grasp the spray bottle" work primitive may be used in tasks that do not involve cleaning, such as "paint the wall" (where the spray bottle=spray paint), "style the hair" (where the spray bottle=hairspray), or "prepare the stir-fry meal" (where the spray bottle=cooking oil spray).

FIG. 1 is an illustrative diagram of an exemplary robot system 100 comprising various features and components described throughout the present robots, computer program products, and devices. Robot system 100 comprises a robot body 101 with a first physically actuatable component 102a and a second physically actuatable component 102b mechanically coupled to body 101. In the illustrated implementation, first and second physically actuatable components 102a and 102b each correspond to a respective robotic hand, though a person of skill in the art will appreciate that in alternative implementations a physically actuatable component may take on other forms (such as an arm or leg, a non-hand-like end effector such as a cutter or suction tube, or any other form useful to the particular applications the robot is intended to perform). Robotic hand 102a emulates a human hand and includes multiple fingers 121a, 122a, 123a, and 124a and an opposable thumb 125a. Robotic hand 102b is similar to a mirror-image of robotic hand 102a while corresponding details are not labeled for robotic hand 102b to reduce clutter. Robotic hands 102a and 102b may be physically actuatable by a variety of different means, including electromechanical actuation, cable-driven actuation, magnetorheological fluid-based actuation, and/or hydraulic actuation. Some exemplary details of actuation technology that may be employed to physically actuate robotic hands 102a and 102b are described in U.S. patent application Ser. No. 17/491,577 and U.S. Provisional Patent Application Ser. No. 63/191,732, filed May 21, 2021 and entitled "Systems, Devices, And Methods For A Hydraulic Robotic Arm", both of which are incorporated by reference herein in their entirety.

Robot body 101 further includes at least one sensor 103 that detects and/or collects data about the environment and/or objects in the environment of robot system 100. In the illustrated implementation, sensor 103 corresponds to a sensor system including a camera, a microphone, and an inertial measurement unit that itself comprises three orthogonal accelerometers, a magnetometer, and a compass, though in other implementations any appropriate type of sensor could be included.

For the purposes of illustration, FIG. 1 includes details of certain exemplary components that are carried by or within robot body 101 in accordance with the present robots, computer program products, and devices. Such components include at least one processor 130 and at least one non-transitory processor-readable storage medium, or "memory", 140 communicatively coupled to processor 130. Memory 140 stores at least one library of reusable work primitives 141 (which may or may not include a library of reusable grasp primitives for either or both of robotic hands 102a and/or 102b depending on the implementation) and processor-executable instructions 142 that, when executed by processor 130, cause robot body 101 (including applicable actuatable components such as either or both of robotics hands 102a and/or 102b) to selectively and autonomously perform at least one reusable work primitives in library of reusable work primitives 141. In some implementations, memory 140 stores an entire catalog of reusable work primitives usable by the robot. To reduce processing burden, the catalog of reusable work primitives is organized into a plurality of libraries of work primitives, each library including fewer reusable work primitives than the catalog of reusable work primitives. The at least one processor 130 accesses each library as needed to accomplish a given work objective, execute a given workflow, or select work primitives for a workflow. Depending on the specific implementation, processor-executable instructions 142 may further include processor-executable instructions (e.g., a computer program product) that cause robot system to perform any or all of methods 200, 300, and/or 400 described herein.

Processor 130 is also communicatively coupled to a wireless transceiver 150 via which robot body 101 sends and receives wireless communication signals 160 with an exemplary teleoperation system 170. To this end, teleoperation system 170 also includes a wireless transceiver 171.

For the purposes of illustration, teleoperation system 170 includes both a low-level teleoperation interface 180 and a high-level teleoperation interface 190. Low-level teleoperation interface 180 includes a sensor system 181 that detects real physical actions performed by a human pilot 182 and a processing system 183 that converts such real physical actions into low-level teleoperation instructions that, when executed by processor 130, cause robot body 101 (and any applicable actuatable components such as hands 102a and/or 102b) to emulate the physical actions performed by pilot 182. In some implementations, sensor system 181 may include many sensory components typically employed in the field of virtual reality games, such as haptic gloves, accelerometer-based sensors worn on the body of pilot 182, and a VR headset that enables pilot 182 to see optical data collected by sensor 103 of robot body 101. High-level teleoperation interface 190 includes a simple GUI displayed, in this exemplary implementation, on a tablet computer. The GUI of high-level teleoperation interface 190 provides a set of buttons each corresponding to a respective action performable by robot body 101 (and applicable actuatable components such as hands 102a and/or 102b). Action(s) selected by a user/pilot of high-level teleoperation interface 190 through the GUI are converted into high-level teleoperation instructions that, when executed by processor 130, cause robot body 101 (and any applicable actuatable components such as hands 102a and/or 102b) to perform the selected action(s).

Teleoperation system 170 is also shown as including at least one non-transitory processor-readable storage medium (memory) 172, which optionally stores reusable work primitives for access by the robot. This is particularly useful when memory 140 does not store an entire catalog of reusable work primitives usable by the robot. In such an implementation, the entire catalog of reusable work primitives usable by the robot can be stored on the memory 172, for access by the robot as needed. As discussed above, the catalog of reusable work primitives is organized into libraries of work primitives, where the robot can access libraries of reusable work primitives as needed. As needed, at least one library of reusable work primitives can be transferred from teleoperation system 170 to the robot via wireless transceivers 171 and 150, and stored on memory 140.

Teleoperation system 170 can be implemented in a distributed manner. For example, memory 172 can be at a server location remote from low-level teleoperation interface 180 and/or remote from high-level teleoperation interface 190. As another example, low-level teleoperation interface 180 can be remote from high-level teleoperation interface 190.

Robot system 100 in FIG. 1 is illustrated such that the robot generally emulates or mimics human anatomy. However, this is not necessarily the case, and any appropriate form of robot could be used. In some implementations, a robot may only partially emulate human anatomy (e.g. the robot may only include a limited subset of human-like features), or a robot may not emulate human anatomy at all.

Figure 2:
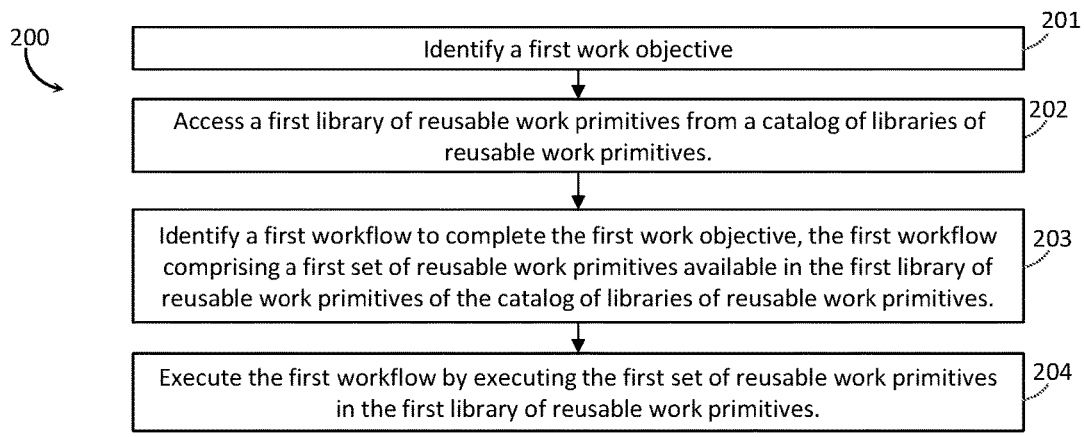
FIG. 2 is a flow diagram showing an exemplary method of operation of a robot in accordance with the present robots, methods, and computer program products.

FIG. 2 is a flow diagram showing an exemplary method 200 of operation of a robot. In general, throughout this specification and the appended claims, a method of operation of a robot is a method in which at least some, if not all, of the various acts are performed by the robot. For example, certain acts of a method of operation of a robot may be performed by at least one processor or processing unit (hereafter "processor") of the robot communicatively coupled to a non-transitory processor-readable storage medium of the robot and, in some implementations, certain acts of a method of operation of a robot may be performed by peripheral components of the robot that are communicatively coupled to the at least one processor, such as one or more physically actuatable components (e.g., arms, legs, end effectors, grippers, hands), one or more sensors (e.g., optical sensors, audio sensors, tactile sensors, haptic sensors), mobility systems (e.g., wheels, legs), communications and networking hardware (e.g., receivers, transmitters, transceivers), and so on. The non-transitory processor-readable storage medium of the robot may store data (including, e.g., at least one library of reusable work primitives) and/or processor-executable instructions that, when executed by the at least one processor, cause the robot to perform the method and/or cause the at least one processor to perform those acts of the method that are performed by the at least one processor. The robot may communicate, via communications and networking hardware communicatively coupled to the robot's at least one processor, with remote systems and/or remote non-transitory processor-readable storage media. Thus, unless the specific context requires otherwise, references to a robot's non-transitory processor-readable storage medium, as well as data and/or processor-executable instructions stored in a non-transitory processor-readable storage medium, are not intended to be limiting as to the physical location of the non-transitory processor-readable storage medium in relation to the at least one processor of the robot and the rest of the robot hardware. In other words, a robot's non-transitory processor-readable storage medium may include non-transitory processor-readable storage media located on-board the robot and/or non-transitory processor-readable storage media located remotely from the robot, unless the specific context requires otherwise. Further, a method of operation of a robot such as method 200 (or any of the other methods discussed herein) can be implemented as a computer program product. Such a computer program product comprises processor-executable instructions or data that, when the computer program product is stored on a non-transitory processor-readable storage medium of the robot, and the computer program product is executed by at least one processor of the robot, the computer program product (or the processor-executable instructions or data thereof) cause the robot to perform acts of the method.

Returning to FIG. 2, method 200 as illustrated includes four acts 201, 202, 203, and 204, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 201, the robot (e.g. by the at least one processor 130) identifies a first work objective. In some implementations, the robot may identify the first work objective in response to receiving instructions from another party, such as verbal instructions from a remote or local controller or operator. In some implementations, the robot may include a communication interface (e.g. wireless transceiver 150) communicatively coupled to the at least one processor and the identification, by the robot, of the first work objective at 201 may include receiving, by the communication interface of the robot (e.g., from a remote operator or tele-operation system), instructions related to the first work objective. Such instructions may include a definition of the first work objective, parameters dictating how/when/where the first work objective should be completed, and/or directions on how to carry out the first work objective.

In other implementations, the identification, by the robot, of the first work objective at 201 may include the robot itself (e.g. by the at least one processor 130) autonomously identifying the first work objective. In such implementations, the non-transitory processor-readable storage medium of the robot may store data, models, policies, paradigms, algorithms, frameworks, architectures, and/or processor-executable instructions (collectively, "artificial intelligence") that, when executed by the at least one processor of the robot, cause the robot to autonomously identify the first work objective. The artificial intelligence may autonomously identify the first work objective based on a range of different parameters and/or criteria, including without limitation: sensor data, environmental factors, internal parameters, observations, and/or communications with other systems, robots, devices, or people. As an example, the robot can include at least one sensor (such as the at least one sensor 103 in FIG. 1), which captures sensor data representing an environment of the robot (such as visual data representing the environment of the robot, or location data representing a location of the robot, as non-limiting examples). Based on the sensor data, the at least one processor of the robot can identify the first work objective. For example, if the sensor data is representative of the robot being in a bathroom, the robot may identify the first work objective as "clean the bathroom". The identification of the first work objective by the robot does not have to be limited to being based on the sensor data, and can be based on additional data or information. For example, after identifying that the robot is in a bathroom, the robot may access cleaning history for the bathroom (e.g. by querying a robot management server such as teleoperation system 170). If the cleaning history indicates that the bathroom was recently cleaned (e.g. within the last hour or few hours), the robot may identify the first work objective as "Check the state of the bathroom". In this way, the robot uses additional context data (cleaning history) to determine the most appropriate work objective.

Context data received by the communication interface can be used by the robot to identify the first work objective in many situations, even independently of sensor data collected by at least one sensor of the robot. As a non-limiting example, a fleet of robots may be utilized to clean and maintain a building. When identifying a work objective to perform (e.g. the first work objective), a robot may access a cleaning history database, which indicates a cleaning history for a variety of areas or cleaning tasks for the building. Based on the database, the robot may identify a first work objective based on what areas or tasks are in greatest need of being taken care of (e.g. what areas or tasks have not been taken care of in the longest amount of time). As another non-limiting example, a robot may have access to weather information as context data. Such weather information may indicate that it is presently raining or rained recently. Based on this weather context data, the robot may determine that the floors of a building or area in the care of the robot need to be cleaned.

At 202, the robot accesses a first library of reusable work primitives from a catalog of libraries of reusable work primitives. As discussed earlier, a catalog of work primitives includes all of the reusable work primitives available and usable by the robot. A catalog of libraries of reusable work primitives refers to the catalog of work primitives, where the reusable work primitives are organized into a plurality of libraries of work primitives. Each library (including the first library of reusable work primitives) includes fewer reusable work primitives than the catalog of libraries of reusable work primitives (though there can be overlap between reusable primitives included in each library as discussed above).

It is preferable that libraries of reusable work primitives which the robot needs are stored locally at the robot (e.g. on memory 140). To this end, libraries relevant to a service category which a robot is expected or intended to operate in, or libraries which the robot might foreseeably need during a deployment, can be pre-loaded onto the robot prior to deployment. In such a case, accessing the first library of reusable work primitives from the catalog of libraries of reusable work primitives as at 202 comprises accessing the first library of reusable work primitives stored on the at least one non-transitory processor-readable storage medium of the robot (e.g. memory 140). However, if at 202 the first library of reusable work primitives which is needed is not stored locally at the robot, accessing the first library of reusable work primitives from the catalog of libraries of reusable work primitives can comprise accessing via the communication interface of the robot (e.g. wireless transceiver 150), the first library of reusable work primitives stored on at least one remote non-transitory processor-readable storage medium of a device remote from the robot (e.g. memory 172 of teleoperation device 170). That is, libraries of reusable work primitives can be stored remotely from the robot, such as on a teleoperation device or on a server accessible to the robot, and the robot can access libraries of reusable work primitives as needed. This enables flexibility in the event that the objectives or tasks faced by the robot don't align with the reusable work primitives it was pre-loaded with. Further, accessing the first library of reusable work primitives stored on at least one remote non-transitory processor-readable storage medium of a device remote from the robot can comprise transferring, via the communication interface of the robot, the first library of reusable work primitives to the at least one non-transitory processor-readable storage medium of the robot (e.g. transferring the first library of reusable work primitives from memory 172 to memory 140). This provides quick access to the first library of reusable work primitives. This discussion applies to any library of reusable primitives needed by the robot (and is not limited to the first library of reusable work primitives).

At 203, the robot identifies a first workflow to complete the first work objective identified at 201. The first workflow comprises a first set of reusable work primitives available in the first library of reusable work primitives. For example, identifying, by the robot, the first workflow may include identifying or defining a first set or combination of reusable work primitives that, when performed by the robot, will complete the first work objective. Identifying, by the robot, the first workflow may further include sequencing or otherwise arranging the first set or combination of reusable work primitives into a first permutation of the first set of reusable work primitives. As previously described, at 202 the first library of reusable work primitives is accessed, and the first workflow identified by the robot at 203 comprises, or consists of, a first set or combination of reusable work primitives selected from the first library of reusable work primitives accessed by the robot.

When the robot includes a communication interface (e.g. wireless transceiver 150) communicatively coupled to the at least one processor, the identification, by the robot, of the first workflow at 203 may include receiving the first workflow, an indication of the first workflow, or instructions related thereto, by the communication interface of the robot (e.g., from a remote operator or tele-operation system). Such an indication or instructions may include a definition of the first workflow, including for example a first set or combination of reusable work primitives and, optionally, a permutation of the first set or combination of reusable work primitives to complete the first work objective.

In other implementations, the identification, by the robot, of the first workflow at 203 may include the robot itself autonomously identifying a first set, combination, and/or permutation of reusable work primitives that make up the first workflow. In such implementations, the non-transitory processor-readable storage medium of the robot may store data, models, policies, paradigms, algorithms, frameworks, architectures, and/or processor-executable instructions (collectively, "artificial intelligence") that, when executed by the at least one processor of the robot, cause the robot to autonomously identify the first workflow. The artificial intelligence may autonomously identify the first workflow based on a range of different parameters and/or criteria, including without limitation: sensor data, environmental factors, internal parameters, observations, and/or communications with other systems, robots, devices, or people. As an example, the robot can include at least one sensor (such as the at least one sensor 103 in FIG. 1), which captures sensor data representing an environment of the robot (such as visual data representing the environment of the robot, or location data representing a location of the robot, as non-limiting examples). Based on the sensor data, the at least one processor of the robot can identify the first workflow. For example, if the sensor data is representative of the robot being in front of a mirror, the robot may identify the first workflow by organizing a first set of work primitives to clean the mirror (such as described above). The identification of the first workflow by the robot does not have to be limited to being based on the sensor data, and can be based on additional data or information. For example, in some cases different cleaning products may be used at different times to clean the same objects or areas (i.e., different products may be used in a rotation). As a non-limiting example, sinks in a bathroom may be cleaned several times a day, with most of the cleanings being performed with a soap, and with one or two of the cleanings being performed with bleach. When identifying a workflow to accomplish the objective of cleaning a sink, a robot or teleoperation system which is organizing the first workflow can access time and/or date data, and the workflow can be defined to cause the robot to identify the correct cleaning solution, and grab said correct cleaning solution.

Context data received by the communication interface can be used by the robot to identify the first workflow in many situations, even independently of sensor data collected by at least one sensor of the robot. As a non-limiting example, a hauling robot (a robot which moves objects between locations) may be carrying an object, but may not be able to identify what the object is (e.g. it may be in a non-descript box). In such a case, the robot may be able to access context data (e.g. a database stored on a server or teleoperation device) which indicates what object the robot is carrying. For example, the robot could access the database to determine what object was positioned at a location where the object was picked up from. As another example, the robot may be able to scan an optical code (e.g. barcode or QR code) on the box, and look up what object corresponds to the scanned code in the database. Based on what the object is, the first workflow can be identified to involve maneuvering the robot to place the object in the correct location for said object.

In some implementations, acts 202 and 203 in method 200 can be performed in the reverse order from that illustrated in FIG. 2. In particular, identifying the first workflow to complete the first work objective at 203 can comprise identifying a first permutation of a first combination of reusable work primitives from the catalog of libraries of reusable work primitives. Based on the determined combination of reusable work primitives, an appropriate library of reusable work primitives (the first library in the case of method 200) is accessed by the robot as in 202.

At 204, the robot executes the first workflow identified at 203. Generally, in executing the first workflow at 204, the robot executes the first set of reusable work primitives in the first library of reusable work primitives identified in the first workflow at 203. As previously described, in some implementations the robot may be trained, configured, or otherwise operable to perform each reusable work primitive in the library of reusable work primitives substantially autonomously or automatically. For example, the non-transitory processor-readable storage medium of the robot may store respective sets of processor-executable instructions that, when executed by the at least one processor of the robot, each cause the robot to autonomously perform a respective one of the reusable work primitives in the first library of work primitives. Thus, when the robot executes the first workflow at 204, the robot may do so substantially autonomously or automatically by executing the sets of processor-executable instructions that cause or enable the robot to autonomously perform the particular reusable work primitives in the first set of reusable work primitives that correspond to the first workflow.

For the purpose of illustration, an exemplary implementation of method 200 is now described.

As an example, a robot may include or access a non-transitory processor-readable storage medium that stores: i) a first library of five first reusable work primitives: A, B, C, D, and E; and ii) five respective sets of processor-executable instructions inst(A), inst(B), inst(C), inst(D), and inst(E) that, when executed by at least one processor of the robot, each cause the robot to autonomously perform a respective one of the first reusable work primitives. At 201 of method 200, the robot identifies a first work objective (either autonomously or upon receiving instructions as described previously). At 202 of method 200, the robot accesses the first library of reusable work primitives stored on the non-transitory processor-readable storage medium of the robot. At 203 of method 200, the robot identifies a first workflow to complete the first work objective (either autonomously or upon receiving instructions as previously described). The first workflow comprises, or consists of, a first set of reusable work primitives from the first library of reusable work primitives arranged in a first order. In this example, the first workflow consists of reusable work primitives B, C, and D arranged as:

$$C \rightarrow B \rightarrow D$$

At 204, the robot autonomously executes the first workflow. That is, at least one processor of the robot executes processor-executable instructions inst(C) to cause the robot to autonomously perform reusable work primitive C, then at least one processor of the robot executes processor-executable instructions inst(B) to cause the robot to autonomously perform reusable work primitive B, then at least one processor of the robot executes processor-executable instructions inst(D) to cause the robot to autonomously perform reusable work primitive D. In this way, the robot completes the first work objective: semi-autonomously if the robot relies on receiving instructions in order to define the first workflow at 203, or completely autonomously if the robot is operable to autonomously define the first workflow at 203.

In accordance with the present robots, methods, and computer program products, the catalog of libraries of reusable work primitives may include a plurality of libraries of reusable work primitives directed to respective service categories. For example, the first library of reusable work primitives stored or accessed by the robot may comprise, or consist of, all of the genericized activities, steps, or sub-tasks necessary to enable the robot to complete a multitude of different work objectives within a specific service category. A "service category" refers generally to the nature or type of work a robot is expected to perform in a given deployment. Non-limiting examples of service categories include medical service (e.g. nursing or patient care services); cleaning service; housekeeping service; warehouse service (e.g. management or movement of objects, items, or stock about or among warehouses or storage locations); fetch service (e.g. going to retrieve objects, items, or people); delivery service (bringing objects, items, or people somewhere); repair service (e.g. fixing or maintaining equipment); painting service; and retail service (e.g. cashier or store management). Each library in the catalog of libraries can be directed to a respective service category selected from available services categories, including but not limited to the examples listed above. A robot can be designed to operate within a specific service category (e.g., a medical service robot may include custom medical hardware or be made of medically safe or sterilizable material), or a robot may be generic to multiple service categories. In cases where a generic robot is deployable in different service categories, the robot can be preloaded with, or access, at least one library appropriate for the service category in which the robot is to be deployed. For example, prior to or during deployment for painting services, a robot may be loaded with or access at least one library of reusable work primitives which enable to robot to perform painting related tasks, and/or operating painting-related tools. Further, deployment in a specific service category is not necessarily permanent. By changing the at least one library of reusable work primitives readily available to the robot, a service category in which the robot is intended to operate can also be changed.

The present robots, methods, and computer program products may realize, or at least approximate, general purpose robots that are capable of completing a wide range of different work objectives in a wide range of different industries, without overburdening a robot with every possible action or work primitive the robot may ever be faced with, but rather by providing the robot with a targeted and specific library or libraries of reusable work primitives related to a service category the robot is intended to operate in. As mentioned above, inclusion of extra reusable work primitives exponentially increases a possible number of workflows, and thus exponentially increases processing burden to identify or construct workflows. Consequently, it is preferable (though not strictly required) for a library to include the bare minimum reusable work primitives necessary to enable the robot to complete all expected workflows for operation in a service category corresponding to the library. However, in some cases, this could lead to the robot not having appropriate or optimal reusable work primitives to complete certain edge-case tasks that arise when deployed. Thus, in some implementations, it is preferable to strike a balance between including reusable work primitives beyond the bare minimum (e.g. reusable work primitives which may be needed, even if said reusable work primitives are not certainly going to be needed), while still not including reusable work primitives which will most likely not be needed for operation in a particular service category.

Continuing the example above, the exemplary library of five reusable work primitives may, for example, comprise:
A: measure environmental data
B: move to *position_x*
C: pick up *object_i*
D: put down *object_j*
E: barcode scan *object_k*
and the first work objective may be stated as: "move the green box to the storage room". Thus, when the robot performs the first workflow C→B→D, the robot: executes inst(C) where *object_i*="green box" which causes the robot to autonomously (i.e., with no further control or instruction from another party) pick up the green box; executes inst(B) where *position_x*="storage room" which causes the robot to autonomously carry the green box to the storage room; and executes inst(D) where *object_j*="green box" which causes the robot to autonomously put down the green box in the storage room. In this way, the robot completes the first work objective by performing the first workflow C→B→D.

Using the same library of five reusable work primitives A, B, C, D, and E, the robot may complete a second work objective. For example, a second work objective may be stated as: "make an inventory of the items in the storage room". The second work objective may be identified by the robot (per act 311 of method 300 discussed later) either autonomously or in response to receiving instructions related to the second work objective from some form of controller or operator. The controller/operator may include a remote tele-operator, an at least semi-autonomous tele-operation system, or a controlling entity (e.g., another robot, or a person) co-located with the robot. A controlling entity co-located with the robot may provide verbal instructions to the robot that the robot is operative to detect and process.

After identification of the second work objective, the robot may access the first library of reusable work primitives and identify a second workflow to complete the second work objective. In a similar way to the first workflow, the second workflow also comprises, or consists of, a set of reusable work primitives from the first library of five reusable work primitives A, B, C, D, and E; however, the second workflow is different from the first workflow in that the second workflow comprises a second, and different, set (e.g., combination and/or permutation) of reusable work primitives from the library of five reusable work primitives A, B, C, D, and E. As previously described, the second workflow may be identified by the robot (per act 313 of method 300 discussed later) either autonomously or in response to receiving instructions defining the second workflow from some form of controller or operator.

In this example, the second workflow consists of reusable work primitives B, C, D, E arranged as:

*B*→repeat:[*C*→*E*→*D*]

In accordance with the present robots, methods, and computer program products, at least one reusable work primitive may be common in multiple workflows. In the present example, reusable work primitives B, C, and D are all commonly included in both the first workflow to complete the first work objective and the second workflow to complete the second work objective.

The exemplary second workflow includes "repeat: [C→E→D]"; therefore, in order to complete the second work objective the robot must repeat primitives C→E→D of the second workflow for all items in the storage room. Thus, when the robot executes the second workflow B→repeat: [C→E→D] (per act 314 of method 300 discussed later), the robot executes inst(B) where *position_x*="storage room" which causes the robot to autonomously (i.e., with no further control or instruction from another party) go to the storage room and then the robot initiates a loop wherein the robot executes primitives C→E→D for all items in the storage room. That is, upon arriving in the storage room, the robot: executes inst(C) where *object_i*="first item" which causes the robot to autonomously pick up a first item in the storage room; executes inst(E) where *object_k*="first item" which causes the robot to autonomously bar code scan the first item; and executes inst(D) where *object_j*="first item" which causes the robot to put down the first item. The robot then repeats primitives C→E→D for each item in the storage room in series (i.e., for a second item, for a third item, and so on) until the robot has picked up, bar code scanned, and put down every item in the storage room. In this way, the robot completes the second work objective by performing the workflow B→repeat:[C→E→D].

Using the same first library of five reusable work primitives A, B, C, D, and E, the robot may complete at least one additional work objective. For example, the robot may record environmental parameters at various stations or waypoints (repeat:[B→A]) and/or checkout customers' purchases at a retail store (repeat:[C→E→D]). These, and many other, work objectives may all be completed by the robot at least semi-autonomously by executing corresponding workflows comprising, or consisting of, various combinations and/or permutations of reusable work primitives from an exemplary first library of five reusable work primitives A, B, C, D, and E. However, a person of skill in the art will appreciate that a library of reusable work primitives may consist of any number and form of reusable work primitives and the first library of five reusable work primitives A, B, C, D, and E described herein is used only as an example for the purpose of illustration. Generally, the more reusable work primitives in a library of reusable work primitives the more different work objectives a robot may be operable to semi-autonomously complete; however, in some implementations a finite number of reusable work primitives (e.g., on the order of 10s, such as 10, 20, 30, 40, 50, 60, 70, 80, 90; or on the order of 100s, such as 100, 200, etc.) may be sufficient to enable a robot to complete a significant portion (e.g., all) of the work objectives of interest.

Figure 3:
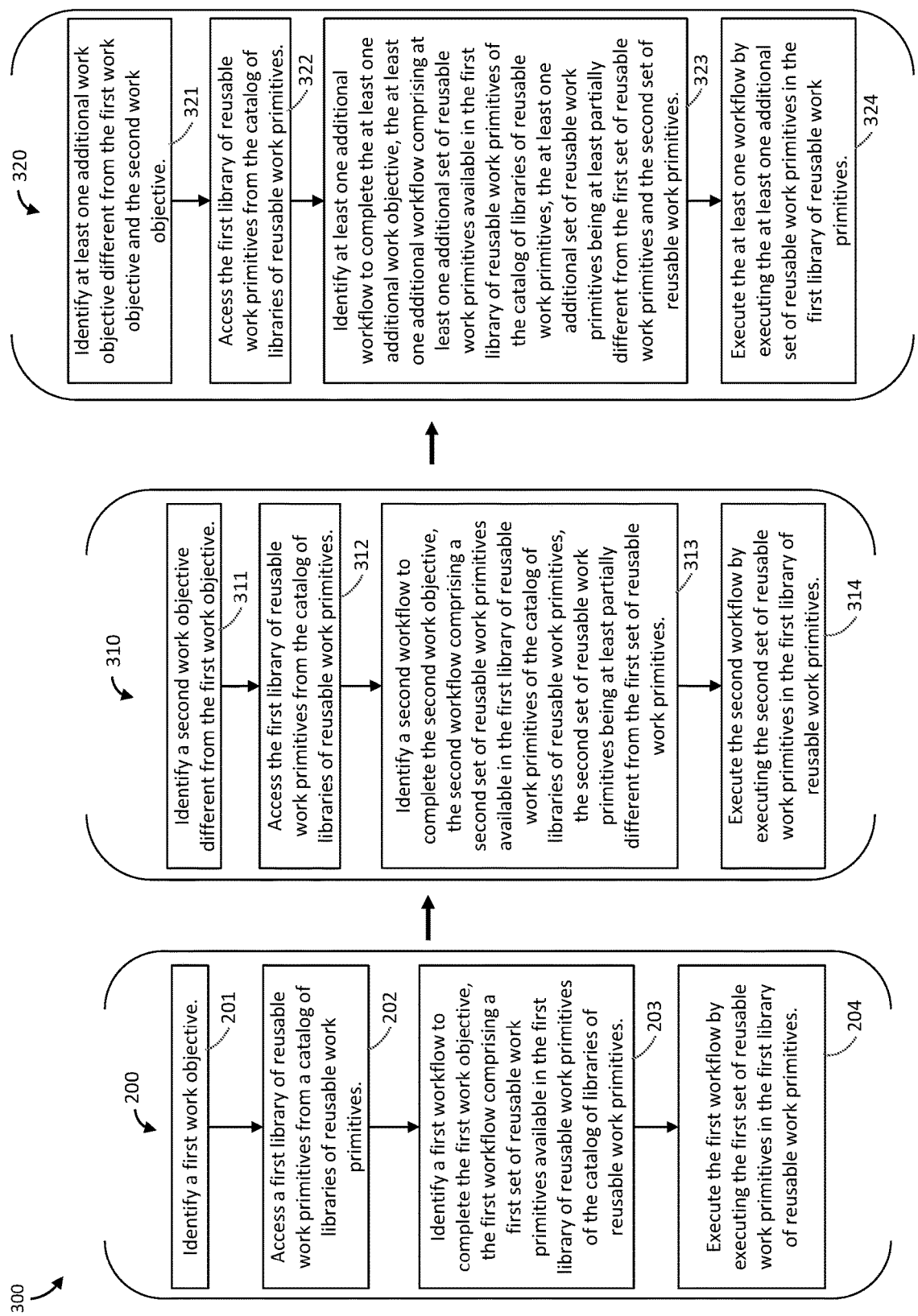
FIG. 3 is a flow diagram showing another exemplary method of operation of a robot in accordance with the present robots, methods, and computer program products.

The examples described above, where a robot employs a first library of reusable work primitives to complete multiple different work objectives, is illustrated in FIG. 3. FIG. 3 is a flow diagram showing an exemplary method 300 of operation of a robot in accordance with the present robots, methods, and computer program products. As discussed above with reference to FIG. 2, a method of operation of a robot is a method in which at least some, if not all, of the various acts are performed by the robot. For example, certain acts of a method of operation of a robot may be performed by at least one processor or processing unit (hereafter "processor") of the robot communicatively coupled to a non-transitory processor-readable storage medium of the robot and, in some implementations, certain acts of a method of operation of a robot may be performed by peripheral components of the robot that are communicatively coupled to the at least one processor, such as one or more physically actuatable components (e.g., arms, legs, end effectors, grippers, hands), one or more sensors (e.g., optical sensors, audio sensors, tactile sensors, haptic sensors), mobility systems (e.g., wheels, legs), communications and networking hardware (e.g., receivers, transmitters, transceivers), and so on. The non-transitory processor-readable storage medium of the robot may store data (including, e.g., at least one library of reusable work primitives) and/or processor-executable instructions that, when executed by the at least one processor, cause the robot to perform the method and/or cause the at least one processor to perform those acts of the method that are performed by the at least one processor. The robot may communicate, via communications and networking hardware communicatively coupled to the robot's at least one processor, with remote systems and/or remote non-transitory processor-readable storage media. Thus, unless the specific context requires otherwise, references to a robot's non-transitory processor-readable storage medium, as well as data and/or processor-executable instructions stored in a non-transitory processor-readable storage medium, are not intended to be limiting as to the physical location of the non-transitory processor-readable storage medium in relation to the at least one processor of the robot and the rest of the robot hardware. In other words, a robot's non-transitory processor-readable storage medium may include non-transitory processor-readable storage media located on-board the robot and/or non-transitory processor-readable storage media located remotely from the robot, unless the specific context requires otherwise. Further, a method of operation of a robot such as method 300 can be implemented as a computer program product. Such a computer program product comprises processor-executable instructions or data that, when the computer program product is stored on a non-transitory processor-readable storage medium of the robot, and the computer program product is executed by at least one processor of the robot, the computer program product (or the processor-executable instructions or data thereof) cause the robot to perform acts of the method.

Method 300 as illustrated in FIG. 3 includes three sub-methods 200, 310, and 320, and twelve illustrated acts 201, 202, 203, 204, 311, 312, 313, 314, 321, 322, 323, and 324, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Method 300 includes, as a sub-method 200, method 200 of operation of a robot to complete a first work objective from FIG. 2. That is, method 300 includes acts 201, 202, 203, and 204 from method 200 of FIG. 2, whereby the robot identifies a first work objective (201), accesses a first library of reusable work primitives from a catalog of libraries of reusable work primitives (202), identifies a first workflow to complete the first work objective (203), and executes the first workflow (204) all substantially as described for method 200 of FIG. 2. As described previously, the first workflow comprises, or consists of, a particular combination and/or permutation of reusable work primitives from a first library of reusable work primitives stored in or otherwise accessed by the robot. In accordance with method 200, various ones of the reusable work primitives in the robot's first library of reusable work primitives are sufficient to enable the robot to complete the first work objective. In sub-method 310, various ones of the reusable work primitives in the robot's first library of reusable work primitives are used and/or reused by the robot to complete a second work objective via acts 311, 312, 313, and 314 (collectively, sub-method 310), and likewise various ones of the reusable work primitives in the robot's first library of reusable work primitives are used and/or reused by the robot to complete at least one additional work objective at sub-method 320.

Specifically, at 311 of sub-method 310 the robot identifies a second work objective that is different from the first work objective identified at 201 of sub-method 200. Similar to as described for act 201, at 311 the second work objective may be identified autonomously by the robot or in response to instructions received from another party (e.g., a controller, pilot, or operator) through any of a variety of different communication means, including verbally, wirelessly through a telecommunications system, digitally through a tethered communication line, and so on.

At 312 of sub-method 310 the robot accesses the first library of reusable work primitives from the catalog of libraries of reusable work primitives. Similar to as described for act 202, at 312 the first library of reusable work primitives is preferably accessed at a local memory of the robot, or could be accessed at a remote memory from the robot which the robot has access to. In some cases act 312 could be performed as (or together with) act 202; that is the first library of reusable work primitives can be accessed simultaneously, for identifying a plurality of workflows and/or completing a plurality of work objectives.

At 313 of sub-method 310, the robot identifies a second workflow to complete the second work objective identified at 311. Since the second work objective is different from the first work objective, the second workflow may be different from the first workflow. Similar to as described for act 203, at 313 identifying, by the robot, the second workflow may include identifying or defining a second set or combination of reusable work primitives that, when performed by the robot, will complete the second work objective, and may further include (if applicable) sequencing or otherwise arranging the second set or combination of reusable work primitives into a second permutation of the second combination of reusable work primitives. In accordance with method 300, the second set or combination of reusable work primitives to complete the second work objective is selected, at 313, from the same first library of reusable work primitives from which the first set or combination of reusable work primitives to complete the first work objective is selected at 203. In some implementations, at least one common reusable work primitive may be included in both the first workflow identified at 203 and the second workflow identified at 313. In other words, in some implementations at least one reusable work primitive from the first workflow identified at 203 is reused in the second workflow identified at 313.

Similar to act 203, at 313 the robot may identify the second workflow autonomously or in response to receiving instructions from another party (e.g., a controller, pilot, or operator) through any of a variety of different communication means, including verbally, wirelessly through a telecommunications system, digitally through a tethered communication line, and so on.

At 314 of sub-method 310, the robot executes the second workflow identified at 313. Generally, in executing the second workflow at 314, the robot executes the second set of reusable work primitives selected from the first library of reusable work primitives in the identification of the second workflow at 313, including (if applicable) at least one common reusable work primitive that is included in both the first workflow (identified at 203 and executed at 204) and the second workflow (identified at 313 and executed at 314). As previously described, in some implementations the robot may be trained, configured, or otherwise operable to perform each reusable work primitive in the first library of reusable work primitives substantially autonomously or automatically. Thus, when the robot executes the second workflow at 314, the robot may do so substantially autonomously or automatically by executing the processor-executable instructions that cause or enable the robot to autonomously perform the particular reusable work primitives in the second set of reusable work primitives that correspond to the second workflow. In implementations where both the first workflow identified at 203 and the second workflow identified at 313 include at least one common reusable work primitive, executing the first workflow at 204 and executing the second workflow at 314 may both include executing, by at least one processor of the robot, at least a same portion of processor-executable instructions that cause the robot to perform the at least one common reusable work primitive in both the first workflow and the second workflow.

In accordance with the present robots, methods, and computer program products, various ones of the reusable work primitives in the robot's first library of reusable work primitives may be further used and/or reused by the robot to complete at least one additional work objective. To this end, method 300 includes sub-method 200 where a robot identifies and executes a first set of reusable work primitives to complete a first work objective, sub-method 310 where the robot identifies and executes a second set of reusable work primitives to complete a second work objective that is different from the first work objective, and sub-method 320 where the robot identifies and executes at least one additional set of reusable work primitives to complete at least one additional work objective that is different from both the first work objective and the second work objective.

In sub-method 320, various ones of the reusable work primitives in the robot's first library of reusable work primitives are used and/or reused by the robot to complete the at least one additional work objective via acts 321, 322, 323, and 324 (collectively, sub-method 320). Specifically, at 321 of sub-method 320 the robot identifies an additional work objective that is different from the first work objective identified at 201 of sub-method 200, and is different from the second work objective identified at 311 of sub-method 310. Similar to as described for act 201, at 321 the at least one additional work objective may be identified autonomously by the robot or in response to instructions received from another party (e.g., a controller, pilot, or operator) through any of a variety of different communication means, including verbally, wirelessly through a telecommunications system, digitally through a tethered communication line, and so on.

At 322 of sub-method 320 the robot accesses the first library of reusable work primitives from the catalog of libraries of reusable work primitives. Similar to as described for act 202, at 322 the first library of reusable work primitives is preferably accessed at a local memory of the robot, or could be accessed at a remote memory from the robot which the robot has access to. In some cases act 322 could be performed as (or together with) act 202; that is the first library of reusable work primitives can be accessed simultaneously, for identifying a plurality of workflows and/or completing a plurality of work objectives.

At 323 of sub-method 320, the robot identifies at least one additional workflow to complete the at least one additional work objective identified at 321. Since the at least one additional work objective is different from the first work objective and the second work objective, the at least one additional workflow may be different from the first workflow and the second workflow. Similar to as described for act 203, at 323 identifying, by the robot, the at least one additional workflow may include identifying or defining at least one additional set or combination of reusable work primitives that, when performed by the robot, will complete the at least one additional work objective, and may further include (if applicable) sequencing or otherwise arranging the at least one additional set or combination of reusable work primitives into at least one additional permutation of the at least one additional combination of reusable work primitives. In accordance with method 300, the at least one additional set or combination of reusable work primitives to complete the at least one additional work objective is selected, at 323, from the same first library of reusable work primitives from which the first set or combination of reusable work primitives to complete the first work objective is selected at 203 and the second set or combination of reusable work primitives to complete the second work objective are selected at 313. In some implementations, at least one common reusable work primitive may be included in the first workflow identified at 203, the second workflow identified at 313, and/or the at least one additional workflow identified at 323. In other words, in some implementations at least one reusable work primitive from the first workflow identified at 203 or the second workflow identified at 313 is reused in the at least one additional workflow identified at 323.

Similar to act 203, at 323 the robot may identify the at least one additional workflow autonomously or in response to receiving instructions from another party (e.g., a controller, pilot, or operator) through any of a variety of different communication means, including verbally, wirelessly through a telecommunications system, digitally through a tethered communication line, and so on.

At 324 of sub-method 320, the robot executes the at least one additional workflow identified at 323. Generally, in executing the at least one additional workflow at 324, the robot executes the at least one additional set of reusable work primitives selected from the first library of reusable work primitives in the identification of the at least one additional workflow at 323, including (if applicable) at least one common reusable work primitive that is included in the first workflow (identified at 203 and executed at 204) or the second workflow (identified at 313 and executed at 314), and the at least one additional workflow (identified at 323 and executed at 324). As previously described, in some implementations the robot may be trained, configured, or otherwise operable to perform each reusable work primitive in the first library of reusable work primitives substantially autonomously or automatically. Thus, when the robot executes the at least one additional workflow at 324, the robot may do so substantially autonomously or automatically by executing the processor-executable instructions that cause or enable the robot to autonomously perform the particular reusable work primitives in the at least one additional set of reusable work primitives that correspond to the at least one additional workflow. In implementations where the first workflow identified at 203, the second workflow identified at 313, or the at least one additional workflow identified at 323 include at least one common reusable work primitive, executing the first workflow at 204, executing the second workflow at 314, and executing the at least one additional workflow at 324 may include executing, by at least one processor of the robot, at least a same portion of processor-executable instructions that cause the robot to perform the at least one common reusable work primitive.

Sub-method 320 in FIG. 3 can be repeated as many times as is appropriate, to complete a plurality of different additional work objectives, by identifying and executing a plurality of different additional workflows.

In each of sub-methods 200, 310, and 320, the same robot is deployed using the same first library of reusable work primitives; however, because the first work objective, the second work objective, and the at least one additional work objective are all different from one another, the corresponding workflows (i.e., the first workflow, the second workflow, and the at least one additional workflow, respectively) identified by the robot to complete the work objectives may all be different from another. In accordance with the present robots, methods, and computer program products, the work primitives in the robot's first library of work primitives are reusable such that any or all of the following is/are true: i) at least one work primitive that is included in the first workflow to complete the first work objective can also be included in (i.e., can be common to or "reused" in) the second workflow to complete the second work objective; ii) at least one work primitive that is included in the second workflow to complete the second work objective can also be included in (i.e., can be common to or "reused" in) the at least one additional workflow to complete the at least one additional work objective; iii) at least one work primitive that is included in the at least one additional workflow to complete the at least one additional work objective can also be included in (i.e., can be common to or reused in) the first workflow to complete the first work objective; and/or iv) at least one work primitive that is included in the first workflow to complete the first work objective can also be included in (i.e., can be common to or reused in) both the second workflow to complete the second work objective and the at least one additional workflow to complete the at least one additional work objective. In the latter scenario, at least one reusable work primitive is included in (i.e., is common to or reused in) all of the first workflow, the second workflow, and the at least one additional workflow. While it is possible for the first workflow, the second workflow, and/or the third workflow to include at least one common reusable work primitive, this is not necessarily required. Rather, the first library of reusable work primitives is generally relevant to a specific service category or role in which the robot is deployed. There may be a great many work objectives which a robot is expected to perform within a given service category or role. Some of these work objectives may be accomplished by workflows with overlapping reusable work primitives, but some work objectives may be accomplished by workflows which use a complete different set of reusable work primitives from other workflows. A library corresponding to a particular service category can include sufficient reusable work primitives such that even very different workflows (e.g. workflows which do not share common reusable work primitives), directed to work objectives within the service category, can still be identified and executed by a robot based on the library. As an example, a robot deployed in a medical service category may execute a workflow to fill a syringe with a medication, and also execute a workflow to push a gurney from one location to another. Even though these two tasks may not share a common reusable work primitive, the library for the service category still includes reusable work primitives to accomplish both tasks.

A robot may come in a variety of different forms and include a variety of different components. A robot may include a body or chassis that includes, houses, carries, or is otherwise mechanically coupled to, as previously described, at least one processor communicatively coupled to at least one non-transitory processor-readable storage medium. Advantageously, a robot may also include at least one physically actuatable component mechanically coupled to the body and communicatively coupled to the at least one processor, the at least one physically actuatable component operable to controllably move and effect changes in, on, or to the robot and/or the robot's environment. Throughout this specification and the appended claims, the term "physically actuatable component" refers to a real physical part of a robot that is controllably actuatable (e.g., by the robot, or by an operator, controller or pilot of the robot) to change in some physical way involving motion (including, without limitation, translation and/or rotation). Non-limiting examples of physically actuatable components include: an arm, an end effector, a gripper, a hand, a finger, a leg, an extendible and/or displaceable support structure such as a neck or boom, and a wheel.

In accordance with the present robots, methods, and computer program products, when a robot includes at least a first physically actuatable component, a catalog of libraries of reusable work primitives can include libraries of reusable work primitives performable by the first physically actuatable component. Further, the first library of reusable work primitives stored in (e.g., the at least one non-transitory processor-readable storage medium of the robot) or otherwise accessed by the robot may include a set of reusable work primitives performable by at least the first physically actuatable component. That is, the robot's reusable work primitives accessible to the robot may include specific reusable work primitives that are each performable by at least the first physically actuatable component.

Figure 4:
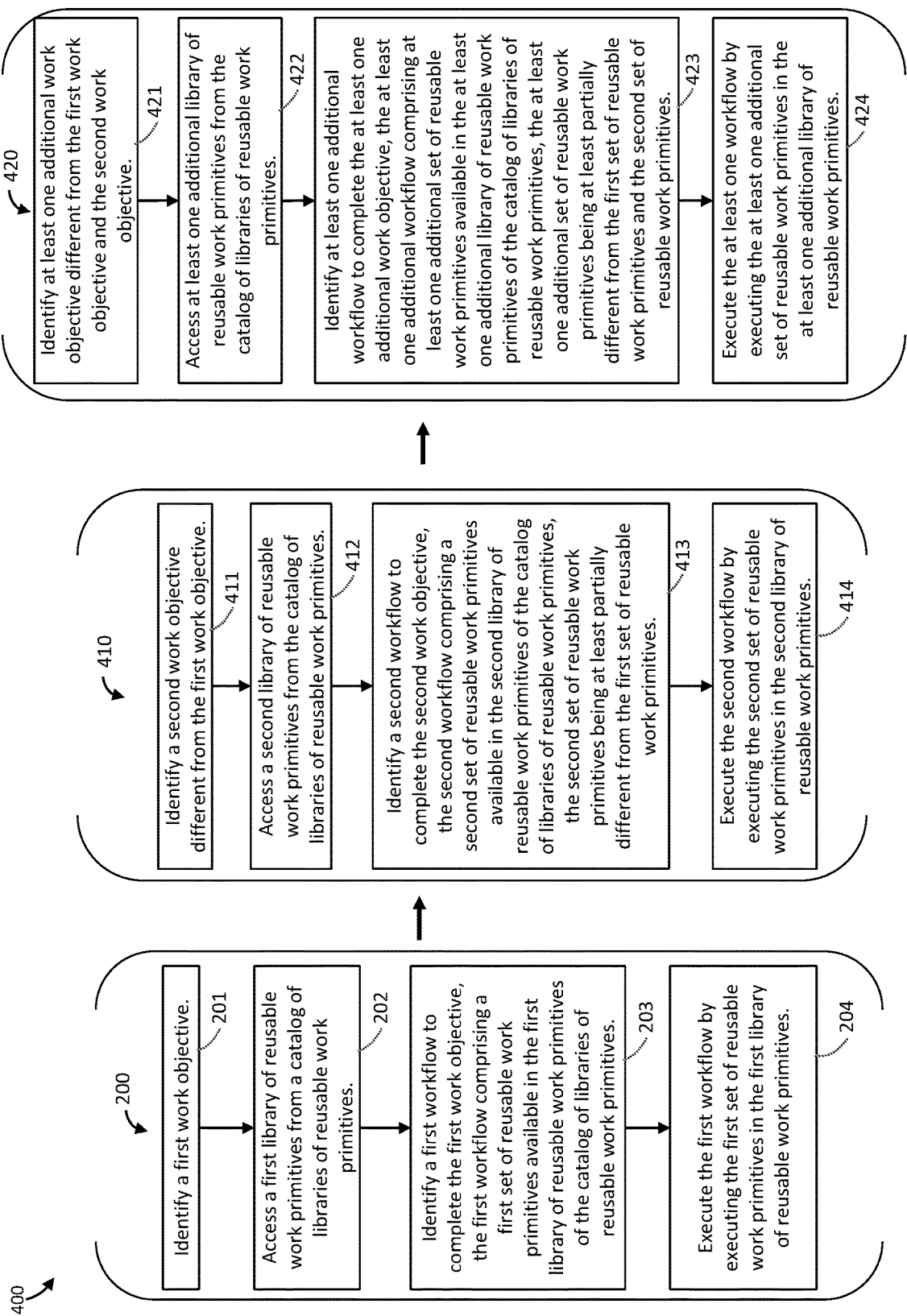
FIG. 4 is a flow diagram showing yet another exemplary method of operation of a robot in accordance with the present robots, methods, and computer program products.

Method 300 in FIG. 3 involves executing a plurality of workflows to complete a plurality of work objectives, based on reusable work primitives from a first library of reusable work primitives. When deploying a robot to perform in a given service category or role, the robot is loaded with the first library of work primitives (the first library of work primitives is stored on a non-transitory processor-readable storage medium of the robot), or the first library is made accessible to the robot (e.g. by being stored on a non-transitory processor-readable storage medium of a server accessible to the robot). Preferably, the first library of reusable work primitives includes every work primitive (or includes a plurality of sub-libraries which together include every work primitive) that the robot could foreseeably need to satisfactorily perform in the service category or role in which the robot is deployed. However, as discussed earlier, the first library of reusable work primitives does not include every work primitive which the robot is capable of using, to save processing or storage resources at the robot. Rather, the first library comprises a subset of reusable work primitives of a catalog of reusable work primitives usable by the robot. In some situations, a robot may need to access at least one reusable work primitive which is not included in the library (e.g. to act in an unforeseen or uncommon situation, or when the robot is being re-deployed in a different service category or role). FIG. 4 discussed below details a method of accomplishing different work objectives using different libraries of reusable work primitives.

FIG. 4 is a flow diagram showing an exemplary method 400 of operation of a robot in accordance with the present robots, methods, and computer program products. Method 400 includes three sub-methods 200, 410, and 420, and twelve illustrated acts 201, 202, 203, 204, 411, 412, 413,

414, 421, 422, 423, and 424, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Method 400 includes, as a sub-method 200, method 200 of operation of a robot to complete a first work objective from FIG. 2. That is, method 400 includes acts 201, 202, 203, and 204 from method 200 of FIG. 2, whereby the robot identifies a first work objective (201), accesses a first library of reusable work primitives from a catalog of libraries of reusable work primitives (202), identifies a first workflow to complete the first work objective (203), and executes the first workflow (204) all substantially as described for method 200 of FIG. 2. As described previously, the first workflow comprises, or consists of, a particular combination and/or permutation of reusable work primitives from a first library of reusable work primitives stored in or otherwise accessed by the robot. In accordance with method 200, various ones of the reusable work primitives in the robot's first library of reusable work primitives are sufficient to enable the robot to complete the first work objective.

In sub-method 410, reusable work primitives in a second library of reusable work primitives accessible to the robot are used and/or reused by the robot to complete a second work objective via acts 411, 412, 413, and 414 (collectively, sub-method 410), and likewise reusable work primitives in at least one additional library of reusable work primitives accessible to the robot are used and/or reused by the robot to complete at least one additional work objective at sub-method 420.

Specifically, at 411 of sub-method 410 the robot identifies a second work objective that is different from the first work objective identified at 201 of sub-method 200. Similar to as described for act 201, at 411 the second work objective may be identified autonomously by the robot or in response to instructions received from another party (e.g., a controller, pilot, or operator) through any of a variety of different communication means, including verbally, wirelessly through a telecommunications system, digitally through a tethered communication line, and so on.

At 412 of sub-method 410 the robot accesses a second library of reusable work primitives from the catalog of libraries of reusable work primitives. Like the first library of reusable work primitives, the second library of reusable work primitives includes fewer reusable work primitives than the catalog of libraries of reusable work primitives. The second library of reusable work primitives is at least partially different from the first library of reusable work primitives as discussed earlier. Similar to as described for act 202, at 412 the second library of reusable work primitives could be accessed at a local memory of the robot, or could be accessed at a remote memory from the robot which the robot has access to.

At 413 of sub-method 410, the robot identifies a second workflow to complete the second work objective identified at 411. Since the second work objective is different from the first work objective, the second workflow may be different from the first workflow. Similar to as described for act 203, at 413 identifying, by the robot, the second workflow may include identifying or defining a second set or combination of reusable work primitives that, when performed by the robot, will complete the second work objective, and may further include (if applicable) sequencing or otherwise arranging the second set or combination of reusable work primitives into a second permutation of the second combination of reusable work primitives. In accordance with method 400, the second set or combination of reusable work primitives to complete the second work objective is selected, at 413, from the second library of reusable work primitives accessed at 412. In some implementations, at least one common reusable work primitive may be included in both the first workflow identified at 203 and the second workflow identified at 413. In other words, in some implementations at least one reusable work primitive from the first workflow identified at 203 is reused in the second workflow identified at 413.

Similar to act 203, at 413 the robot may identify the second workflow autonomously or in response to receiving instructions from another party (e.g., a controller, pilot, or operator) through any of a variety of different communication means, including verbally, wirelessly through a telecommunications system, digitally through a tethered communication line, and so on.

At 414 of sub-method 410, the robot executes the second workflow identified at 413. Generally, in executing the second workflow at 414, the robot executes the second set of reusable work primitives selected from the second library of reusable work primitives in the identification of the second workflow at 413. As previously described, in some implementations the robot may be trained, configured, or otherwise operable to perform each reusable work primitive in the second library of reusable work primitives substantially autonomously or automatically. Thus, when the robot executes the second workflow at 414, the robot may do so substantially autonomously or automatically by executing the processor-executable instructions that cause or enable the robot to autonomously perform the particular reusable work primitives in the second set of reusable work primitives that correspond to the second workflow. In implementations where both the first workflow identified at 203 and the second workflow identified at 413 include at least one common reusable work primitive, executing the first workflow at 204 and executing the second workflow at 414 may both include executing, by at least one processor of the robot, at least a same portion of processor-executable instructions that cause the robot to perform the at least one common reusable work primitive in both the first workflow and the second workflow.

In accordance with the present robots, methods, and computer program products, reusable work primitives in at least one additional library of reusable work primitives may be further used and/or reused by the robot to complete at least one additional work objective. To this end, method 400 further includes sub-method 420 where the robot identifies and executes at least one additional set of reusable work primitives to complete at least one additional work objective that is different from both the first work objective and the second work objective.

In sub-method 420, reusable work primitives in at least one additional library of reusable work primitives are used and/or reused by the robot to complete the at least one additional work objective via acts 421, 422, 423, and 424 (collectively, sub-method 420). Specifically, at 421 of sub-method 420 the robot identifies an additional work objective that is different from the first work objective identified at 201 of sub-method 200, and is different from the second work objective identified at 411 of sub-method 410. Similar to as described for act 201, at 421 the at least one additional work objective may be identified autonomously by the robot or in response to instructions received from another party (e.g., a controller, pilot, or operator) through any of a variety of different communication means, including verbally, wirelessly through a telecommunications system, digitally through a tethered communication line, and so on.

At 422 of sub-method 420 the robot accesses at least one additional library of reusable work primitives from the catalog of libraries of reusable work primitives. Like the first library of reusable work primitives and the second library of reusable work primitives, the at least one additional library of reusable work primitives includes fewer reusable work primitives than the catalog of libraries of reusable work primitives. Similar to as described for act 202, at 422 the at least one additional library of reusable work primitives can be accessed at a local memory of the robot, or could be accessed at a remote memory from the robot which the robot has access to.

At 423 of sub-method 420, the robot identifies at least one additional workflow to complete the at least one additional work objective identified at 421. Since the at least one additional work objective is different from the first work objective and the second work objective, the at least one additional workflow may be different from the first workflow and the second workflow. Similar to as described for act 203, at 423 identifying, by the robot, the at least one additional workflow may include identifying or defining at least one additional set or combination of reusable work primitives that, when performed by the robot, will complete the at least one additional work objective, and may further include (if applicable) sequencing or otherwise arranging the at least one additional set or combination of reusable work primitives into at least one additional permutation of the at least one additional combination of reusable work primitives. In accordance with method 400, the at least one additional set or combination of reusable work primitives to complete the at least one additional work objective is selected, at 423, from the at least one additional library of reusable work primitives accessed at 422. In some implementations, at least one common reusable work primitive may be included in the first workflow identified at 203, the second workflow identified at 413, and/or the at least one additional workflow identified at 423. In other words, in some implementations at least one reusable work primitive from the first workflow identified at 203 or the second workflow identified at 413 is reused in the at least one additional workflow identified at 423.

Similar to act 203, at 423 the robot may identify the at least one additional workflow autonomously or in response to receiving instructions from another party (e.g., a controller, pilot, or operator) through any of a variety of different communication means, including verbally, wirelessly through a telecommunications system, digitally through a tethered communication line, and so on.

At 424 of sub-method 420, the robot executes the at least one additional workflow identified at 423. Generally, in executing the at least one additional workflow at 424, the robot executes the at least one additional set of reusable work primitives selected from the at least one additional library of reusable work primitives in the identification of the at least one additional workflow at 423. As previously described, in some implementations the robot may be trained, configured, or otherwise operable to perform each reusable work primitive in the at least one additional library of reusable work primitives substantially autonomously or automatically. Thus, when the robot executes the at least one additional workflow at 424, the robot may do so substantially autonomously or automatically by executing the processor-executable instructions that cause or enable the robot to autonomously perform the particular reusable work primitives in the at least one additional set of reusable work primitives that correspond to the at least one additional workflow. In implementations where the first workflow identified at 203, the second workflow identified at 413, or the at least one additional workflow identified at 423 include at least one common reusable work primitive, executing the first workflow at 204, executing the second workflow at 414, and executing the at least one additional workflow at 424 may include executing, by at least one processor of the robot, at least a same portion of processor-executable instructions that cause the robot to perform the at least one common reusable work primitive.

Sub-method 420 in FIG. 4 can be repeated as many times as is appropriate, to complete a plurality of different additional work objectives, by identifying and executing a plurality of different additional workflows.

In an exemplary use case, if a deployed robot finds itself unable to accomplish a work objective (the second work objective) using the first library of reusable work primitives (preferably stored on a memory of the robot), the robot can access the second library of reusable work primitives, identify a second workflow, and execute the second workflow per sub-method 410 in FIG. 4. Further, if the deployed robot finds itself unable to accomplish another work objective (the at least one additional work objective) using the first library of reusable work primitives or the second library of work objectives, the robot can access the at least one additional library of reusable work primitives, identify at least one additional workflow, and execute the at least one additional workflow per sub-method 420 in FIG. 4.

In another exemplary use case, a robot may be deployed in a first service category, where the robot generally accesses the first library of reusable work primitives, identifies work objectives and workflows, and executes workflows based on the first library of reusable work primitives, in accordance with method 200 in FIG. 2 (or sub-method 200 in FIG. 4). Said robot may be redeployed to a second service category different from the first service category, where expectations and objectives of the robot will be different from the first service category. During deployment in the second service category, the robot generally accesses a second library of reusable work primitives, identifies work objectives and workflows, and executes workflows based on the second library of reusable work primitives, in accordance with sub-method 410 in FIG. 4. Further, said robot may be further redeployed to at least one additional service category different from the first service category and the second service category, where expectations and objectives of the robot will be further different from the first service category and the second service category. During deployment in the at least one additional service category, the robot generally accesses at least one additional library of reusable work primitives, identifies work objectives and workflows, and executes workflows based on the at least one additional library of reusable work primitives, in accordance with sub-method 420 in FIG. 4.

FIG. 4 illustrates the ability for the robot to operate in different service categories, based on different libraries of work primitives selected based on a pertinent service category for deployment. All of the sub-methods 200, 410, and 420 are not necessarily required for a particular robot.

The completion of some work objectives may advantageously deploy a robot's first physically actuatable component, e.g., in order to effect a change on the robot and/or its environment. In this case, when the robot identifies a workflow to complete a work objective per act 203 of method 200, act 313 of (sub-method 310 of) method 300, act 323 of (sub-method 320 of) method 300, act 413 of (sub-method 410 of) method 400, and/or act 423 of (sub-method 410 of) method 400, the robot may identify a set of reusable work primitives that includes at least one reusable work primitive from the set of reusable work primitives performable by the first physically actuatable component. When the robot executes a workflow, per act 204 of method 200, act 314 of (sub-method 310 of) method 300, act 324 of (sub-method 320 of) method 300, act 414 of (sub-method 410 of) method 400, and/or act 424 of (sub-method 410 of) method 400, the robot executes or performs the at least one reusable work primitive from the set of reusable work primitives performable by the first physically actuatable component, which results in the first physically actuatable component actuating to effect a change on the robot or the robot's environment in some deliberate way characterized by the at least one reusable work primitive performable by the first physically actuatable component. Specific examples of the above for which the at least one physically actuatable component is or includes a component (e.g., end effector) operative to grasp objects, such as a gripper or hand, are discussed in U.S. patent application Ser. No. 17/566,589, which is incorporated herein by reference in its entirety.

Several examples discussed above mention that a library of reusable work primitives is stored on the robot, and/or accessed by the robot, to execute a workflow to accomplish a work objective. Said library of reusable work primitives is ideally as relevant as possible to the work objective or workflow, or a service category or role in which the robot operates. To this end, the library (e.g. the first library in method 200) is selected from a plurality of libraries of reusable work primitives (the catalog of libraries of reusable work primitives), where each library of reusable work primitives includes a respective plurality of reusable work primitives which is at least partially different from respective pluralities of reusable work primitives included in other libraries of reusable work primitives. Several examples are discussed below regarding how a library is selected for use in identifying a workflow and executing the workflow. While the examples reference the first library (in method 200, sub-method 200, sub-method 310, or sub-method 320), the discussion applies to selection of any library, such as the second library in sub-method 410 or the at least one additional library in sub-method 420.

In a first example, with reference to method 200, the first library of reusable work primitives is selected from the catalog of libraries of reusable work primitives based on the first work objective. That is, based on a work objective to be accomplished by the robot, an appropriate library from the catalog of libraries or reusable work primitives is selected for access and use by the robot.

In a second example, with reference to method 200, the first library of reusable work primitives is selected from the catalog of libraries of reusable work primitives based on the first workflow. That is, a workflow is identified by the robot (e.g. based on all reusable work primitives usable by the robot, even if all of the reusable work primitives are not stored at or readily accessible to the robot); based on the identified workflow, an appropriate library from the catalog of libraries or reusable work primitives is selected for access and use by the robot (e.g. the appropriate library can be transferred to the robot, or made accessible to the robot on a server).

In a third example, with reference to method 200, the first library of reusable work primitives from the catalog of libraries of reusable work primitives is selected based on a service category. The service category could be intrinsic to the robot (e.g. the robot is designed to operate in the service category), or the service category could be assigned to a robot that is otherwise generic to multiple service categories. In one implementation, at least one processor of the robot could identify a service category based on an indication of the service category stored on at least one non-transitory processor-readable storage medium of the robot. For example, prior to or during deployment of the robot, instructions relating to the service category of the robot could be transferred to the non-transitory processor-readable storage medium of the robot. In another implementation, where the robot includes a communication interface communicatively coupled to at least one processor of the robot, the at least one processor or the robot can identify the service category based on an indication of the service category received via the communication interface. For example, instructions indicating a service category could be sent to the robot from a remote device or server, to deploy the robot in the service category (or to redeploy and already deployed robot in a different service category). In these exemplary implementations, based on the identified service category, the robot accesses an appropriate, relevant, or corresponding library of reusable work primitives.

In each of method 200 (or sub method 200), sub method 310, sub-method 320, sub-method 410, and sub-method 420, identifying a work objective is illustrated as occurring prior to accessing a library of reusable work primitives used to complete the work objective. For example, with reference to method 200 in FIG. 2, identifying the first work objective as in 201 can include identifying the first work objective based at least in part on a service category. However, this is not necessarily the case. In some cases, accessing a library of reusable work primitives can occur prior to identifying a work objective, and identification of a work objective is based on the accessed library of reusable work primitives. For example, with reference to method 200 in FIG. 2, the first library of reusable work primitives can be accessed at 202, then identifying the first work objective at 201 can be based on the first library of reusable work primitives. Such a sequence can be advantageous in situations where a robot is uncertain what it should be doing (e.g. has multiple possible work objectives, or has work objectives which the robot has relatively low confidence are appropriate). In such situations, the robot can determine what work objective is most appropriate, based on what the robot is capable of readily doing (by virtue of reusable work primitives in the first library accessed by the robot). In such implementations/scenarios, identifying a workflow can also be based on a library of reusable work primitives accessed by the first robot. For example, identifying the first workflow as at 203 includes identifying the first workflow based on the first library of reusable work primitives accessed at 202. Though this discussion specifically references method 200 in FIG. 2 and acts thereof, a similar discussion is also applicable to sub-methods 200, 310, 320, 410, and 420 in FIGS. 3 and 4, and is not repeated for brevity.

As discussed earlier, the catalog of libraries of reusable work primitives includes a plurality of libraries of reusable work primitives. Each library of reusable work primitives includes a respective plurality of reusable work primitives which is at least partially different from respective pluralities of reusable work primitives included in other libraries of reusable work primitives. Some examples are discussed below of how different libraries of reusable work primitives are defined (i.e. how a plurality of reusable work primitives are grouped together as a library).

In some cases, each library of reusable work primitives is defined according to a set of work objectives performable by reusable work primitives included in the respective library of reusable work primitives. In a sense, this can be considered as defining a library of reusable work objectives based on a service category to which the library is directed. For example, for a given service category, certain work objectives will commonly, generally, or at least occasionally be expected to be completed by the robot. A service category, and a corresponding library of reusable work primitives, can be defined based on work objectives expected to be performed when a robot is deployed in such a service category.

In other cases, each library of reusable work primitives is defined according to a place of use for the respective library of reusable work primitives. That is, in some cases a place of use is indicative of what actions a robot may need to perform, and thus what reusable work primitives the robot may need to use. For example, a robot deployed in a hospital may be expected to perform medical activities, and thus can have access to reusable work primitives related to such medical activities.

The above means for defining libraries of reusable work primitives are merely exemplary, and other means for defining libraries of reusable work primitives could be implemented as appropriate for a given application.

In accordance with the present robots, methods, and computer program products, a multi-purpose robot may be trained to autonomously execute a finite number of reusable work primitives in order to autonomously perform a multitude of tasks. Such a multi-purpose robot may include an on-board non-transitory processor-readable storage medium communicatively coupled to at least one on-board processor. The non-transitory processor-readable storage medium may store data and/or processor-executable instructions, which may include a library of reusable primitives from a catalog of libraries of reusable work primitives that the robot is capable of performing autonomously. In operation, the at least one processor of the robot may execute data and/or processor-executable instructions to cause the robot to analyze a task and identify a particular sequence of work primitives from the stored library of work primitives that, when carried out by the robot, will result in completion of the task's objective.

The robots described herein may, in some implementations, employ any of the teachings of U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/253,591, U.S. Provisional Patent Application Ser. No. 63/293,968, U.S. Provisional Patent Application Ser. No. 63/293,973, U.S. Provisional Patent Application Ser. No. 63/278,817, and/or U.S. Patent Application Ser. No. 17/566,589, each of which is incorporated herein by reference in its entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of operation of a robot, the robot comprising a robot body, at least one processor carried by the robot body, and at least one non-transitory processor-readable storage medium carried by the robot body and communicatively coupled to the at least one processor, the method comprising:

identifying a first service category;

loading a first library of reusable work primitives from a catalog of libraries of reusable work primitives, the first library of reusable work primitives including fewer reusable work primitives than the catalog of libraries of reusable work primitives and the first library of reusable work primitives specific to the first service category;

identifying a first work objective in the first service category;

identifying a first workflow to complete the first work objective, the first workflow comprising a first set of reusable work primitives available in the first library of reusable work primitives;

executing the first workflow to complete the first work objective, wherein executing the first workflow includes executing the first set of reusable work primitives in the first library of reusable work primitives;

identifying a second service category, the second service category different from the first service category;

loading a second library of reusable work primitives from the catalog of libraries of reusable work primitives, wherein the second library of reusable work primitives:
  includes fewer reusable work primitives than the catalog of libraries of reusable work primitives;
  is specific to the second service category; and
  includes at least one common reusable work primitive that is also included in the first library of reusable work primitives;

identifying a second work objective in the second service category, the second work objective different from the first work objective;

identifying a second workflow to complete the second work objective, the second workflow comprising a second set of reusable work primitives available in the second library of reusable work primitives; and executing the second workflow to complete the second work objective, wherein executing the second workflow includes executing the second set of reusable work primitives in the second library of reusable work primitives, and wherein each of the first service category and the second service category is a respective different service category selected from a group consisting of: a medical service; a cleaning service; a housekeeping service; a warehouse service; a fetch service; a delivery service; a repair service; a painting service; and a retail service.

2. The method of claim 1, further comprising:

identifying at least one additional service category, the at least one additional service category different from both the first service category and the second service category;

loading at least one additional library of reusable work primitives from the catalog of libraries of reusable work primitives, wherein each at least one additional library of reusable work primitives:
  includes fewer reusable work primitives than the catalog of libraries of reusable work primitives;
  is specific to a respective at least one additional service category; and
  includes at least one common reusable work primitive that is also included in at least one other library of reusable work primitives;

identifying at least one additional work objective in the at least one additional service category different from the first work objective and the second work objective;

identifying at least one additional workflow to complete the at least one additional work objective, the at least one additional workflow comprising at least one additional set of reusable work primitives available in the at least one additional library of reusable work primitives, the at least one additional set of reusable work primitives being at least partially different from the first set of reusable work primitives and the second set of reusable work primitives; and executing the at least one additional workflow to complete the at least one additional work objective, wherein executing the at least one additional workflow includes executing the at least one additional set of reusable work primitives in the at least one additional library of reusable work primitives.

3. The method of claim 1 wherein the robot includes a communication interface communicatively coupled to the at least one processor, and wherein identifying the first work objective includes identifying the first work objective based on instructions related to the first work objective received via the communication interface.

4. The method of claim 1 wherein:

the robot includes at least one sensor;

the method further comprises capturing, by the at least one sensor, sensor data representing an environment of the robot; and identifying the first work objective comprises identifying, by the at least one processor of the robot, the first work objective based on at least the sensor data.

5. The method of claim 1 wherein the robot includes a communication interface communicatively coupled to the at least one processor, and identifying the first work objective comprises identifying, by the at least one processor of the robot, the first work objective based on context data received by the communication interface from a device remote from the robot body.

6. The method of claim 1 wherein the robot includes a communication interface communicatively coupled to the at least one processor, and wherein identifying the first workflow includes identifying the first workflow based on an indication related to the first workflow received via the communication interface.

7. The method of claim 1 wherein identifying the first workflow comprises autonomously identifying, by the at least one processor of the robot, the first set of reusable work primitives.

8. The method of claim 1 wherein identifying the first workflow to complete the first work objective includes identifying a first permutation of a first combination of reusable work primitives from the catalog of libraries of reusable work primitives.

9. The method of claim 1 wherein executing the first set of reusable work primitives includes executing, by the at least one processor, processor-executable instructions stored in the non-transitory processor-readable storage medium to cause the robot to autonomously perform the first set of reusable work primitives.

10. The method of claim 1, further comprising selecting the first library of reusable work primitives from the catalog of libraries of reusable work primitives based on the first service category.

11. The method of claim 1 wherein identifying the first workflow includes identifying the first workflow based on the first library of reusable work primitives.

12. The method of claim 1 wherein the first library of reusable work primitives is selected from a plurality of libraries of reusable work primitives, each library of reusable work primitives including a plurality of work primitives which is at least partially different from respective pluralities of reusable work primitives included in other libraires of reusable work primitives.

13. The method of claim 1 wherein:
the robot includes a communication interface communicatively coupled to the at least one processor; and
loading the first library of reusable work primitives from the catalog of libraries of reusable work primitives comprises: accessing, via the communication interface, the first library of reusable work primitives stored on at least one remote non-transitory processor-readable storage medium of a device remote from the robot.

14. The method of claim 1 wherein loading the first library of reusable work primitives from the catalog of libraries of reusable work primitives comprises: accessing the first library of reusable work primitives stored on the at least one non-transitory processor-readable storage medium of the robot.

15. The method of claim 1 wherein the first service category is a warehouse service and the second service category is a repair service.

16. The method of claim 1 wherein the first library of reusable work primitives comprises all reusable work primitives necessary to enable the robot to complete a multitude of different work objectives within the first service category and the second library of reusable work primitives comprises all reusable work primitives necessary to enable the robot to complete a multitude of different work objectives within the second service category, with at least one common reusable work primitive included in both the first library of reusable work primitives and the second library of reusable work primitives.

* * * * *